US012208502B2

(12) United States Patent
LeFavour, Jr. et al.

(10) Patent No.: US 12,208,502 B2
(45) Date of Patent: Jan. 28, 2025

(54) PORTABLE HAND-HELD HYDRAULIC TOOLS

(71) Applicant: Hubbell Incorporated, Shelton, CT (US)

(72) Inventors: John David LeFavour, Jr., Litchfield, NH (US); Robert D. Auger, Merrimack, NH (US); Lawrence N. Brown, Concord, NH (US); Thomas Romeo Faucher, Manchester, NH (US); Peter Matthew Wason, Derry, NH (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 17/967,446

(22) Filed: Oct. 17, 2022

(65) Prior Publication Data

US 2023/0120099 A1 Apr. 20, 2023

Related U.S. Application Data

(60) Provisional application No. 63/256,364, filed on Oct. 15, 2021.

(51) Int. Cl.

| | |
|---|---|
| ***B25F 5/00*** | (2006.01) |
| ***B21D 39/04*** | (2006.01) |
| *B26B 15/00* | (2006.01) |

(52) U.S. Cl.
CPC ............ *B25F 5/005* (2013.01); *B21D 39/048* (2013.01); *B26B 15/00* (2013.01)

(58) Field of Classification Search
CPC ........ B25F 5/005; B21D 39/048; B26B 15/00
See application file for complete search history.

(56) References Cited

U.S. PATENT DOCUMENTS

| | | | | |
|---|---|---|---|---|
| 5,727,417 | A * | 3/1998 | Moffatt | B21F 15/06 72/453.03 |
| 7,066,691 | B2 * | 6/2006 | Doyle | F16D 7/08 408/124 |
| 7,254,982 | B2 * | 8/2007 | Frenken | B25B 27/10 72/407 |
| 7,428,812 | B2 * | 9/2008 | Montminy | B25B 27/10 60/477 |
| 7,464,578 | B2 * | 12/2008 | Ayer | B25B 27/10 72/407 |
| 8,684,882 | B2 * | 4/2014 | Kondo | B25F 5/001 475/299 |

(Continued)

OTHER PUBLICATIONS

International Search Report and Written Opinion in corresponding International Application No. PCT/US22/46877 mailed Feb. 2, 2023. (8 pages).

(Continued)

*Primary Examiner* — Thomas M Wittenschlaeger
*Assistant Examiner* — Katie L Gerth
(74) *Attorney, Agent, or Firm* — Wissing Miller LLP

(57) ABSTRACT

Portable, hand-held hydraulic tools having a modular power unit within a handle assembly and a working head assembly mated to the handle assembly. The working head assembly can have a pair of movable jaws or a movable jaw and a fixed jaw. The jaws can be configured to perform different operating operations, such as crimping operations and cutting operations.

23 Claims, 37 Drawing Sheets

(56) References Cited

U.S. PATENT DOCUMENTS

| | | | | |
|---|---|---|---|---|
| 8,935,948 | B1 * | 1/2015 | Gregory | B21J 15/043 72/453.08 |
| 9,494,200 | B2 * | 11/2016 | Kelleher | F16D 7/00 |
| 2003/0154761 | A1 * | 8/2003 | Lefavour | B25F 5/005 72/453.16 |
| 2006/0272381 | A1 | 12/2006 | Ayer et al. | |
| 2007/0256554 | A1 * | 11/2007 | Montminy | F04B 1/146 92/70 |
| 2012/0319398 | A1 | 12/2012 | Schweizer et al. | |
| 2013/0097873 | A1 * | 4/2013 | Luo | B26B 15/00 30/92 |
| 2014/0274548 | A1 * | 9/2014 | Kelleher | B25B 23/141 475/293 |
| 2015/0283693 | A1 * | 10/2015 | Chiasson | B25F 5/005 173/168 |
| 2015/0288125 | A1 | 10/2015 | Sneath | |
| 2019/0160639 | A1 | 5/2019 | Lefavour et al. | |
| 2019/0232481 | A1 * | 8/2019 | Skinner | B25B 28/00 |
| 2020/0006907 | A1 * | 1/2020 | Torrey | A01G 3/02 |
| 2020/0298388 | A1 | 9/2020 | Norquist et al. | |
| 2021/0154821 | A1 * | 5/2021 | Wason | B25F 5/001 |

OTHER PUBLICATIONS

International Preliminary Report on Patentability in corresponding International Application No. PCT/US22/46877 mailed Apr. 25, 2024. (7 pages).

* cited by examiner

PORTABLE HAND-HELD HYDRAULIC TOOLS

CROSS-REFERENCE TO RELATED APPLICATIONS

The present disclosure is based on and claims benefit from U.S. Provisional Patent Application Ser. No. 63/256,364 filed on Oct. 15, 2021 entitled "Portable Hand-Held Hydraulic Tools" the contents of which are incorporated herein in their entirety by reference.

BACKGROUND

Field

The present disclosure relates generally to hydraulic power tools, and more particularly to portable, hand-held hydraulic power tools with one or more movable jaws or dies in a working head and a modular power unit that can be used with different types of tool handle assemblies.

Description of the Related Art

Hand-held hydraulic tools known in the art typically use cooperating jaws or movable dies that are hydraulically pressed together with great force to crimp electrical connections or cut materials such as electrical conductors. These tools may be battery-powered to allow mobility and portability for the user. These tools typically have different drive systems for different handle assemblies which increases the overall costs to manufacture a tool family.

SUMMARY

The present disclosure relates generally to hydraulic power tools, and more particularly to portable, hand-held hydraulic power tools with one or more movable jaws or dies in a working head and a modular power unit that can be used with different types of tool handle assemblies. In an exemplary embodiment, the hydraulic power tool includes a handle assembly and a working head assembly. The handle assembly has a frame with a main body portion, a neck portion and a hand grip portion. The handle assembly houses a modular power unit that includes a motor, e.g., a brushless motor, a transmission assembly, a pump assembly. The transmission assembly is in series with and is operatively coupled to the motor. The pump assembly is in series with and is operatively coupled to the transmission assembly. The pump assembly may include a unitary pump that has a low pressure pump and a high pressure pump. The handle assembly may also house a fluid reservoir. The fluid reservoir would be in fluid communication with the pump of the pump assembly. The working head assembly is operatively coupled to the handle assembly. The working head assembly includes a head frame and a piston assembly coupled to the head frame. The piston assembly is rotatably coupled to the pump assembly such that the piston assembly is in fluid communication with an output conduit of the pump assembly.

In an exemplary embodiment, the hydraulic power tool includes a frame and a working head assembly. The frame has a main body portion, a neck portion and a hand grip portion. The frame houses a modular power unit that includes a motor module, a transmission module and a pump module. The transmission module is in series with and operatively coupled to the motor module such that rotational movement within the transmission module is translated to reciprocal linear movement to drive the pump module that is in series with the transmission module. The pump module may include a unitary pump that has low pressure pump and a high pressure pump. The frame may also house a fluid reservoir. The fluid reservoir would be in fluid communication with the pump of the pump module. The working head assembly is operatively coupled to the frame. The working head assembly includes a head frame and a piston assembly coupled to the head frame. The piston assembly is rotatably coupled to the pump assembly such that the piston assembly is in fluid communication with an output, e.g., an output fluid conduit, of the pump assembly.

In an exemplary embodiment, the hydraulic power tool includes a frame and a working head assembly. The frame has a main body portion, a neck portion and a hand grip portion. The frame houses a modular power unit that includes a motor, a transmission assembly and a pump assembly. The motor has a motor housing and a motor drive shaft. The transmission assembly is enclosed within a housing. The transmission assembly housing has a first end in series with and directly or indirectly coupled to the motor housing. The transmission assembly is operatively coupled to the motor drive shaft. The pump assembly enclosed within a housing. The pump assembly housing has a first end in series with and directly or indirectly coupled to a second end of the transmission assembly housing. The pump assembly is operatively coupled to the transmission assembly. The pump assembly may include a unitary pump having low pressure pump and a high pressure pump. The frame may also house a fluid reservoir. The fluid reservoir would be in fluid communication with a pump of the pump assembly. The working head assembly is operatively coupled to the neck portion of the frame. The working head assembly has a head frame and a piston assembly coupled to the head frame. The piston assembly is rotatably coupled to a second end of the pump assembly housing so that the piston assembly is in fluid communication with an output, e.g., an output fluid conduit, of the pump assembly.

In the embodiments described herein, the transmission assembly may include a gear assembly and a pump drive assembly. The gear assembly may be a multi-stage gear system, such as a two stage planetary gear assembly. The pump drive assembly may include a drive member operatively coupled to a wobble plate. In such a configuration, rotational movement of the drive member is translated to reciprocal linear movement of the wobble plate. The drive member may be associated with a first bearing system, such as a combination of a thrust bearing and a radial bearing. Similarly, the wobble plate may be associated with a second bearing system, such as a needle bearing and a thrust bearing.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figure 1:
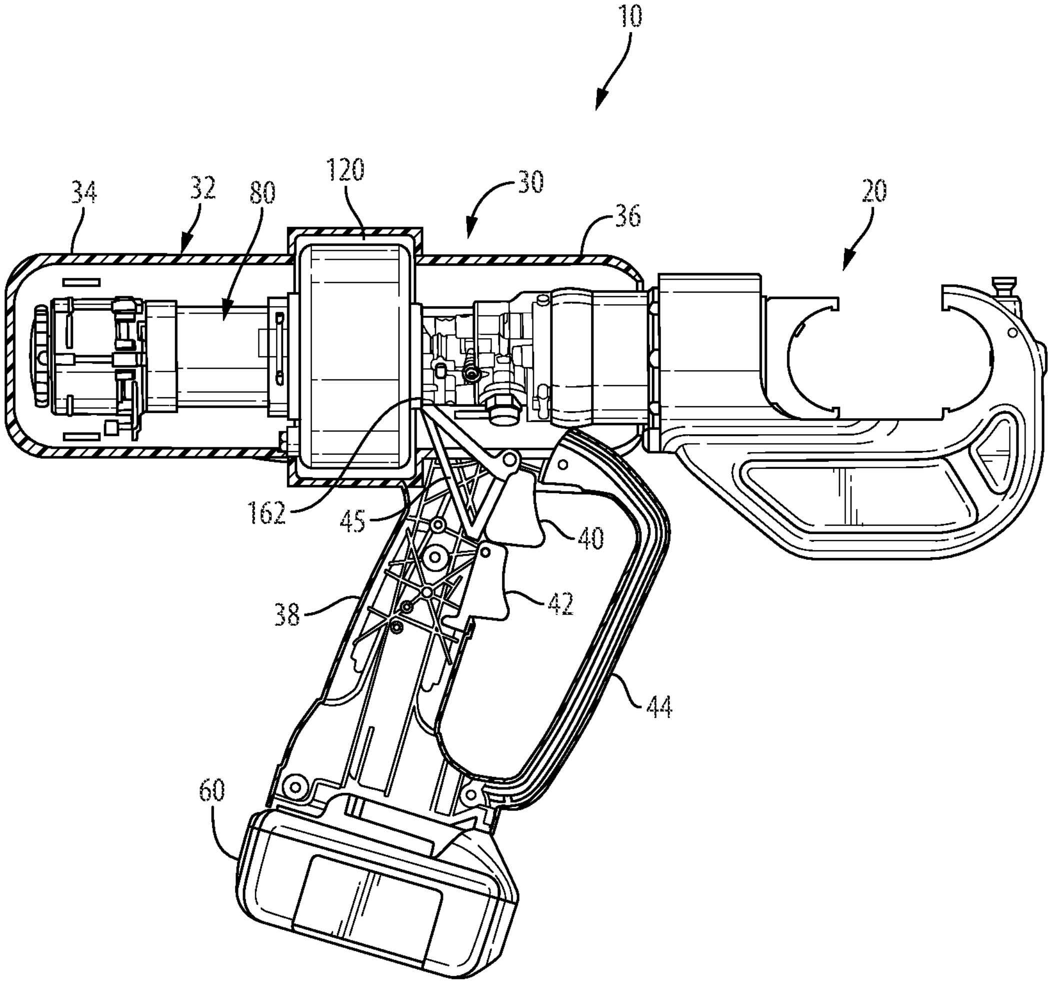
FIG. 1 is a side sectional view of a first side of an exemplary embodiment of a portable, hand-held hydraulic tool according to the present disclosure, illustrating a modular working head assembly and a pistol type handle assembly, and illustrating an exemplary embodiment of a modular power unit according to the present disclosure within the pistol type handle assembly.

The present disclosure will be shown and described in connection with a portable, hand-held, hydraulic tools that utilize a modular power unit to move one or more jaws or one or more dies in a working head assembly of the tools. For ease of description, the portable, hand-held hydraulic tools according to the present disclosure may also be referred to as the "tools" in the plural and the "tool" in the singular. In addition, as used in the present disclosure, the terms "front," "rear," "upper," "lower," "upwardly," "downwardly," and other orientation descriptors are intended to facilitate the description of the exemplary embodiments disclosed herein and are not intended to limit the structure of the exemplary embodiments or limit the claims to any particular position or orientation.

The tools are adapted to be battery-powered and can generate forces of at least 6 tons when acting on a workpiece positioned in a working area of the working head assembly. Non-limiting examples of the tools contemplated by the present disclosure include crimping tools and cutting tools. With some crimping tools, a pair of dies may be used to make a crimp, where one die is typically fixed and the other die is movable. With other crimping tools, an indentor may be movable relative to a fixed nest to make a crimp. With cutting tools, one or more movable jaws with cutting blades can be used to cut a workpiece. However, the present disclosure contemplates that the inventive concepts and aspects of the tools may be implemented in a wide variety of tools, fields and uses. Therefore, the present disclosure should not be deemed to be limited to the embodiments of portable, hand-held, hydraulic crimping or cutting tools shown in the drawings and described herein.

Figure 2:
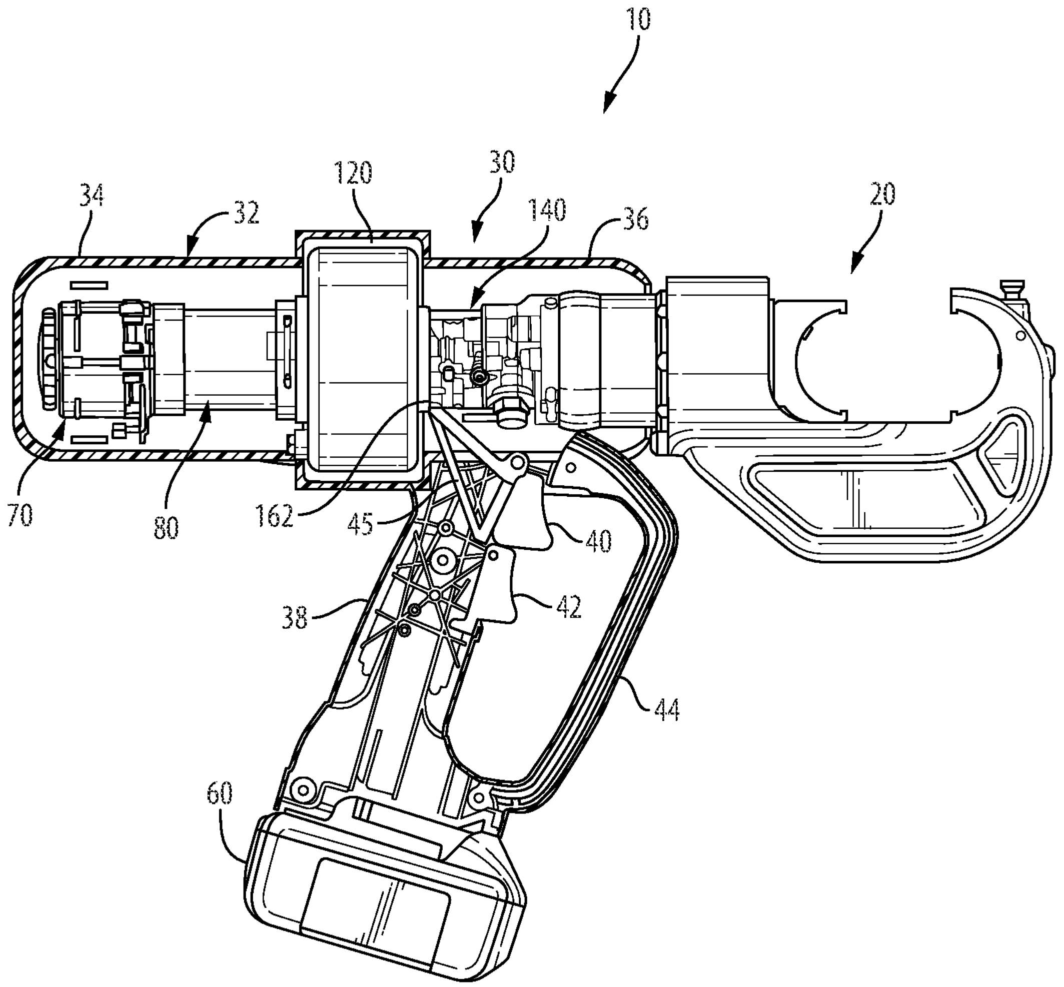
FIG. 2 is a side sectional view of the side of the exemplary embodiment of a portable, hand-held hydraulic power tool similar to FIG. 1.
Figure 3:
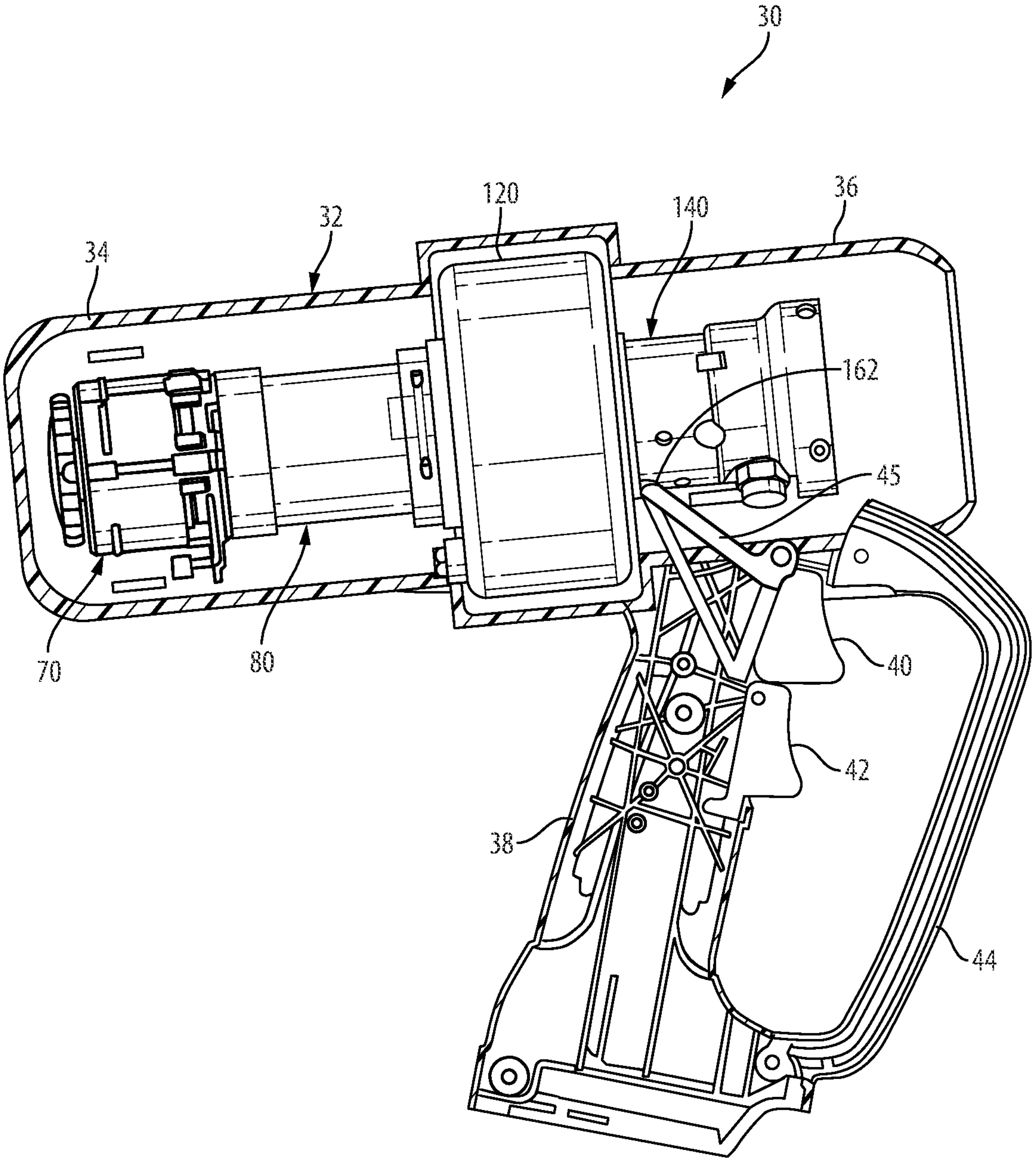
FIG. 3 is a side sectional view of the pistol type handle assembly of FIG. 1, illustrating the modular power unit within the pistol type handle assembly and a fluid reservoir around a perimeter of the modular power unit.
Figure 4:
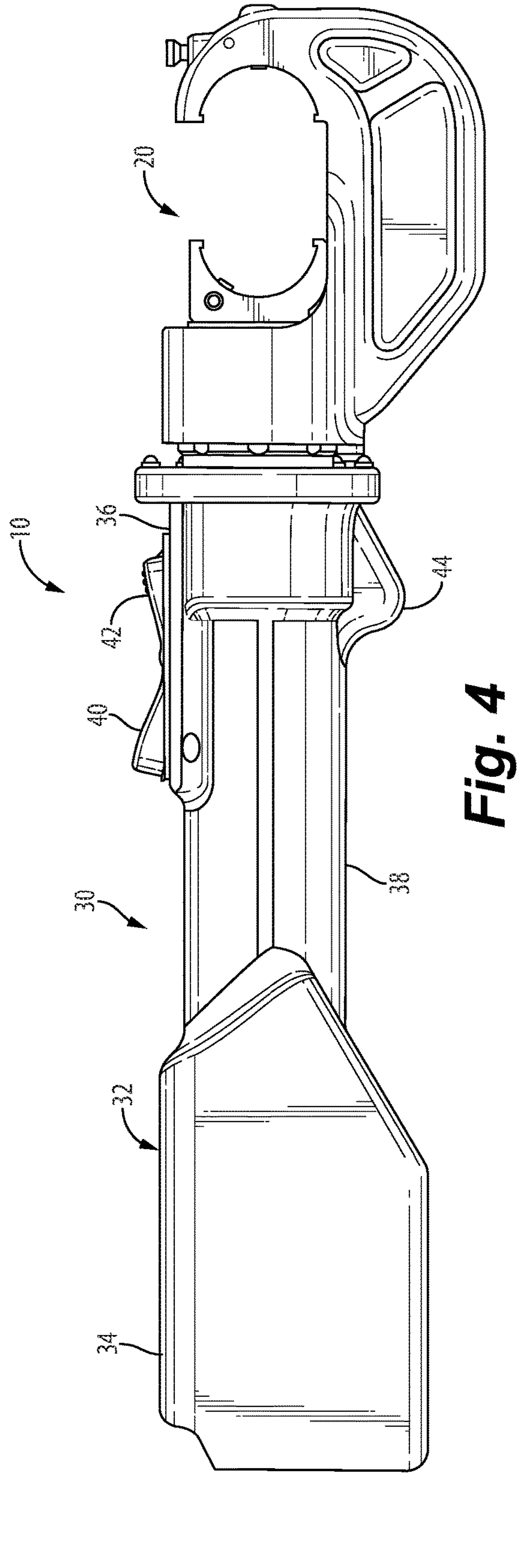
FIG. 4 is a side elevation view of another exemplary embodiment of a portable, hand-held hydraulic power tool according to the present disclosure, illustrating an in-line type handle assembly and the modular power unit within the in-line type handle assembly having multiple upper operator actuators.
Figure 5:
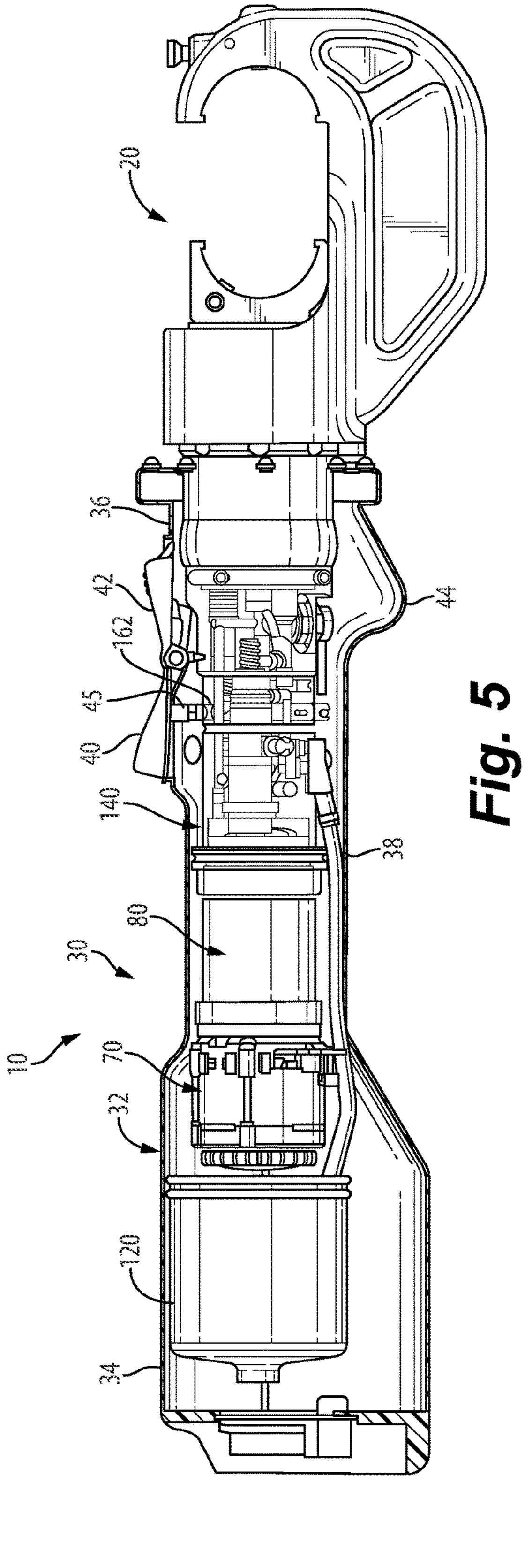
FIG. 5 is a side elevation view with a portion of the handle assembly removed in partial of the portable, hand-held hydraulic power tool of FIG. 4, illustrating a fluid reservoir separated from the modular power unit within a main body portion of the in-line type handle assembly.
Figure 6:
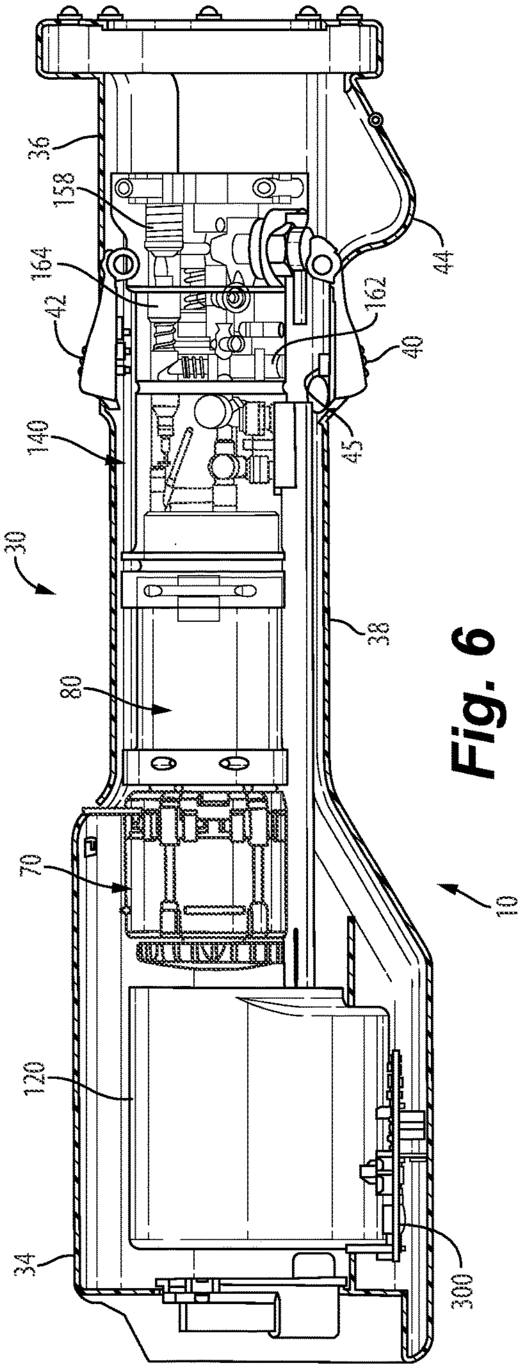
FIG. 6 is a side sectional view of another exemplary embodiment of an in-line handle assembly of a portable, hand-held hydraulic power tool according to the present disclosure, illustrating the in-line handle assembly having upper and lower operator actuators.
Figure 7:
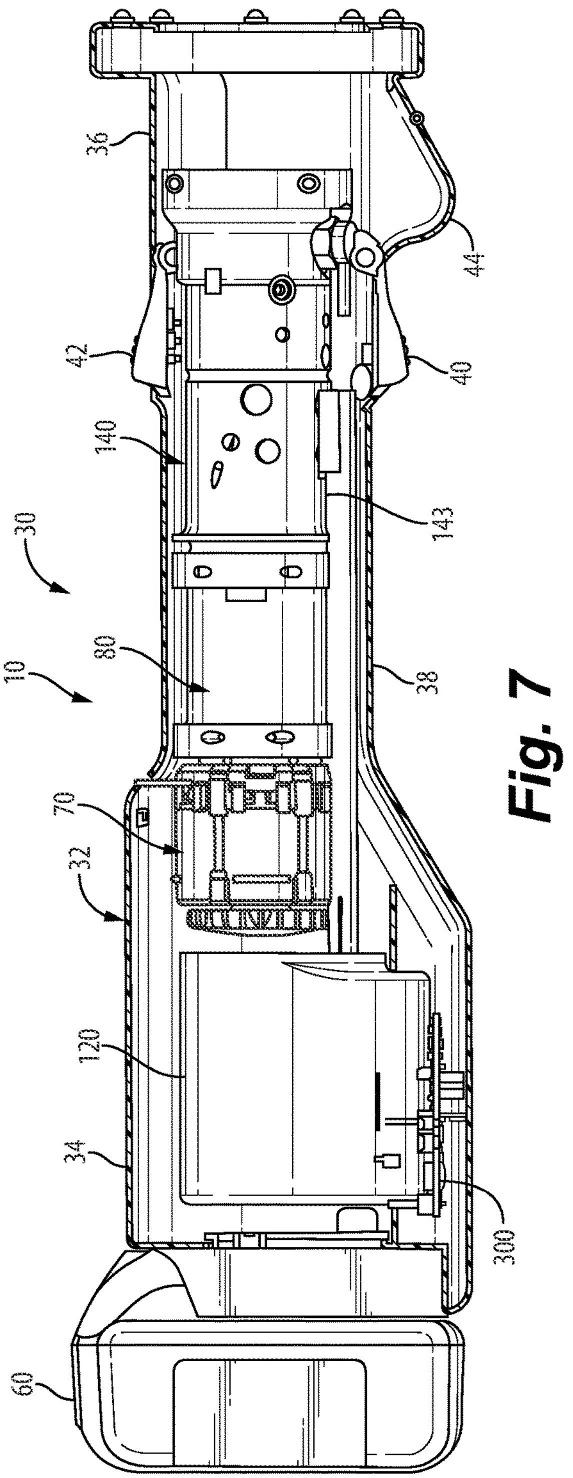
FIG. 7 is another side sectional view of the handle assembly of the portable, hand-held hydraulic power tool of FIG. 6, illustrating a battery attached to the in-line handle assembly.

Referring to FIGS. 1-3, an exemplary embodiment of the tool 10 according to the present disclosure is shown. The tool 10 includes a modular working head assembly 20 operatively connected to a handle assembly 30. In this embodiment, the handle assembly 30 includes a tool frame 32 that is a pistol type tool frame. The tool frame 32 has a main body portion 34, a neck portion 36 and a hand grip portion 38. The tool frame 32 houses a modular power unit 50 for the tool, a controller 300, shown schematically in FIG. 50, that provides electrical controls for the tool, and other components of the tool 10. More specifically, the pistol type tool frame 32 may be a two part housing that when joined together form one or more cavities or compartments configured to receive the modular power unit 50, the controller 300 and other components of the tool 10.

Referring to FIGS. 4-7, another exemplary embodiment of a tool 10 according to the present disclosure is shown. The tool 10 in this embodiment also includes a modular working head assembly 20 operatively connected to a handle assembly 30. In this embodiment, the handle assembly 30 includes a tool frame 32 that is an in-line type tool frame, that may also be referred to as a stick. The tool frame 32 has a main body portion 34, a neck portion 36 and a hand grip portion 38. The tool frame 32 houses the modular power unit 50, the controller 300 that provides electrical controls for the tool, and other components of the tool 10. More specifically, the in-line type tool frame 32 is typically a two part housing that when joined together form one or more cavities or compartments configures to receive the modular power unit 50, the controller 300, seen in FIGS. 6 and 7, and other components of the tool 10. For ease of description, the modular power unit 50 may also be referred to herein as the "power unit." Further, the modular working head assembly 20 may also be referred to herein as the "working head assembly."

In each embodiment of the tool 10, the main body portion 32 is configured and dimensioned to house at least a portion of the power unit 50. The neck portion 36 is configured and dimensioned to house a portion of the working head assembly 20 that couples the working head assembly 20 to the power unit 50. The hand grip portion 38 is configured to be gripped by a user and includes one or more operator controls or actuators 40 and 42, such as switches. In the exemplary embodiment of FIGS. 1-3, the hand grip portion 38 is also configured to mate with a battery 60. In the exemplary embodiment of FIGS. 4-7, the main body portion 32 is also configured to mate with the battery 60.

In the embodiments of FIGS. 1-3 and 4-7, the hand grip portion 38 of the tool frame 32 includes one or more operator controls or actuators, such as switches 40 and 42, that can be manually activated by an operator. In the embodiments shown, the operator control 42 can be used to activate a motor 70 of the tool 10 to start an operating cycle of the tool 10, and the operator control 40 can be used to retract a ram 246, seen in FIGS. 1, 2 and 42, in the working head assembly 20 of the tool 10 by activating a release member 162, seen in FIGS. 1-3, 5, 6 and 33, of a pump assembly 140 of the tool described in more detail below. One or both of the operator controls or actuators, e.g., switches 40 and/or 42, can be operably coupled to the controller 300. The hand grip portion 38 of the tool frame 32 may include a hand guard 44 (FIGS. 1-3) or hilt 44 (FIGS. 4-7) that can protect an operator's hand while operating the tool 10. In the embodiment of FIGS. 4-7, the hilt 44 may include an indicator or illuminator (not shown), e.g., a light such as an LED. The indicator or illuminator would be operatively connected to the controller 300 such that when an operator control or actuator or illuminator, e.g., switch 40 or 42, is actuated the indicator, e.g., the LED light, activates to illuminate a working area of the working head assembly 20.

Referring now to FIG. 6-20, an exemplary embodiment of the power unit 50 is shown. The power unit 50 includes a motor 70, a transmission assembly 80, a fluid reservoir 120, seen in FIGS. 1 and 4, and a pump assembly 140. In the exemplary embodiments of the tool 10 shown in FIGS. 1-3 and in FIGS. 4-7, the main body portion 34 of the tool frame 32 is also configured and dimensioned to house the reservoir 120.

Motor and Transmission Assembly

Figure 8:
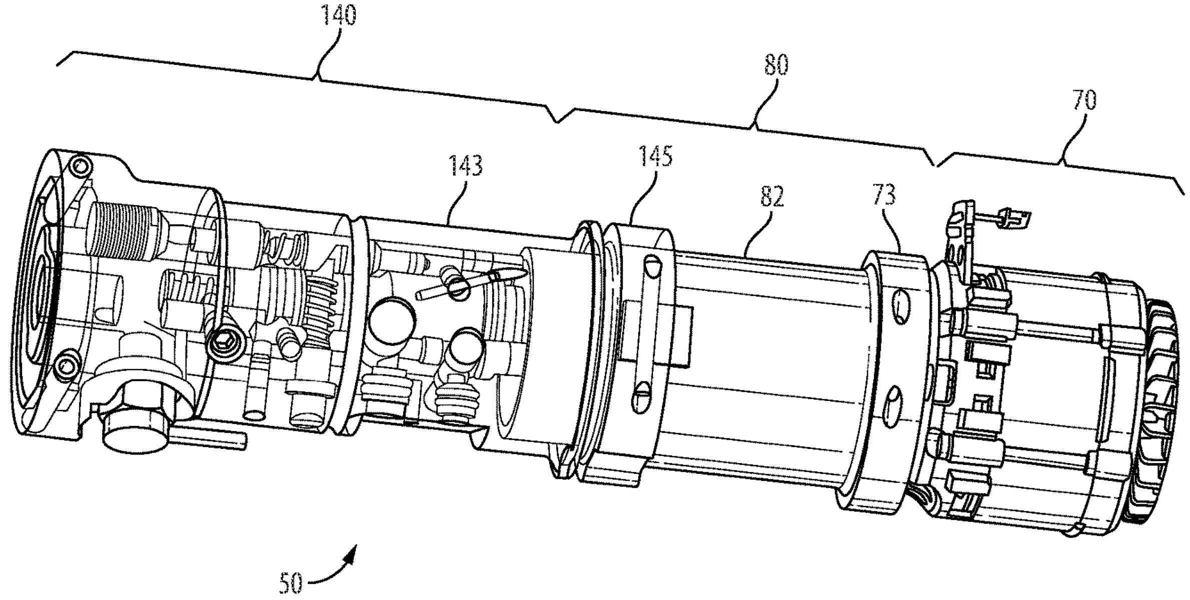
FIG. 8 is a side perspective view of the modular power unit of FIGS. 1 and 3.
Figure 9:
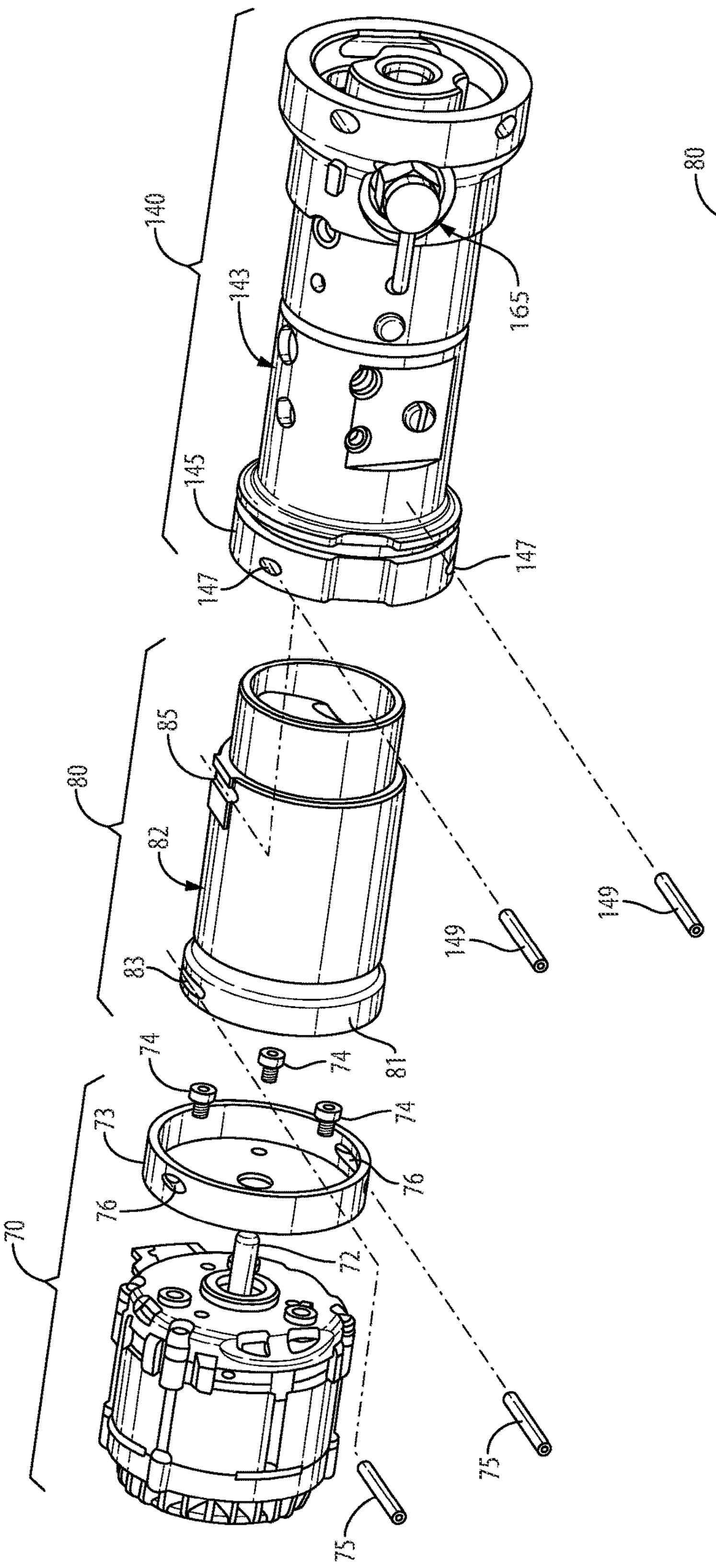
FIG. 9 is an exploded perspective view of the modular power unit of FIG. 8, illustrating a pump assembly, a transmission assembly and a motor.
Figure 10:
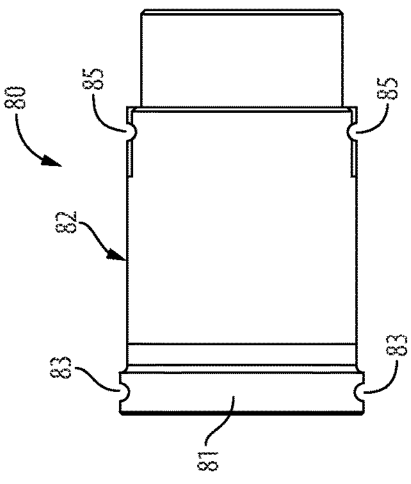
FIG. 10 is a side elevation view of the transmission assembly of FIG. 9.
Figure 11:
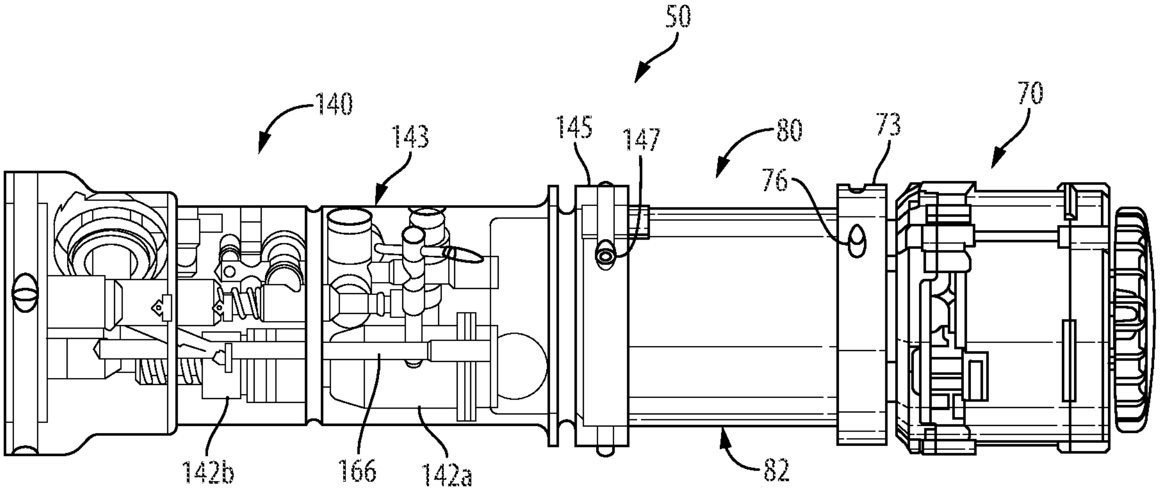
FIGS. 11 and 12 are a first side elevation view of the modular power unit of FIG. 8, illustrating the pump assembly, the transmission assembly and the motor.
Figure 12:
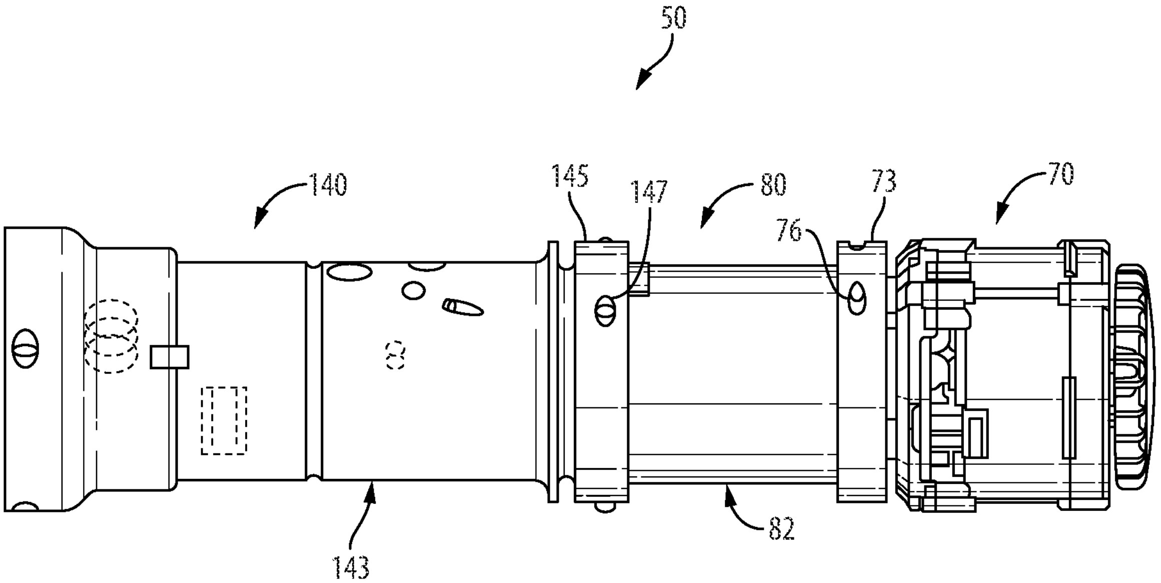
Figure 13:
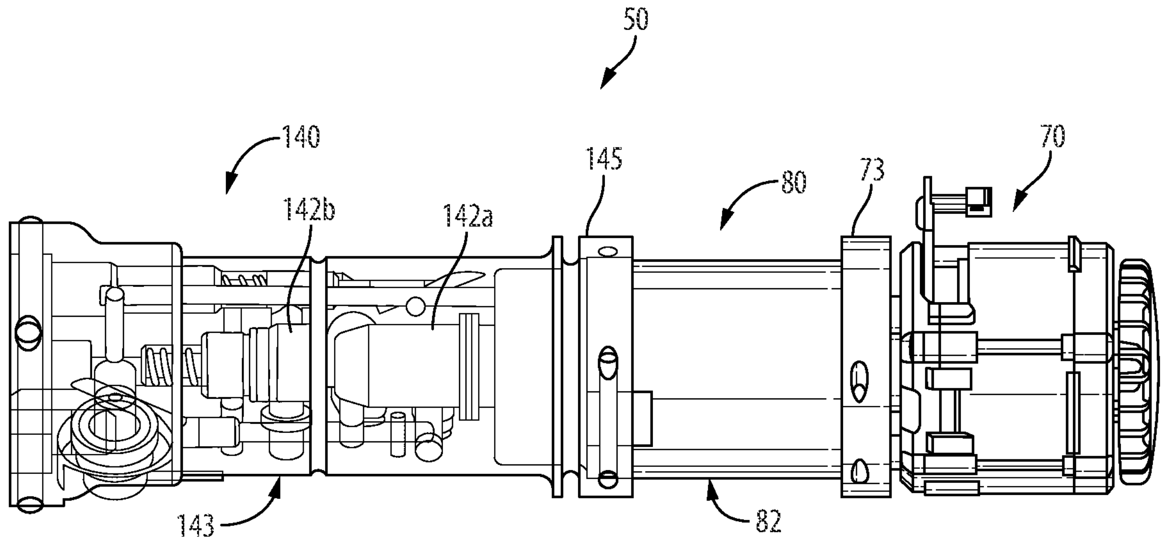
FIGS. 13 and 14 are a second side elevation view of the modular power unit of FIG. 8 rotated approximately 90 degrees from the orientation of the modular power unit of FIGS. 11 and 12.
Figure 14:
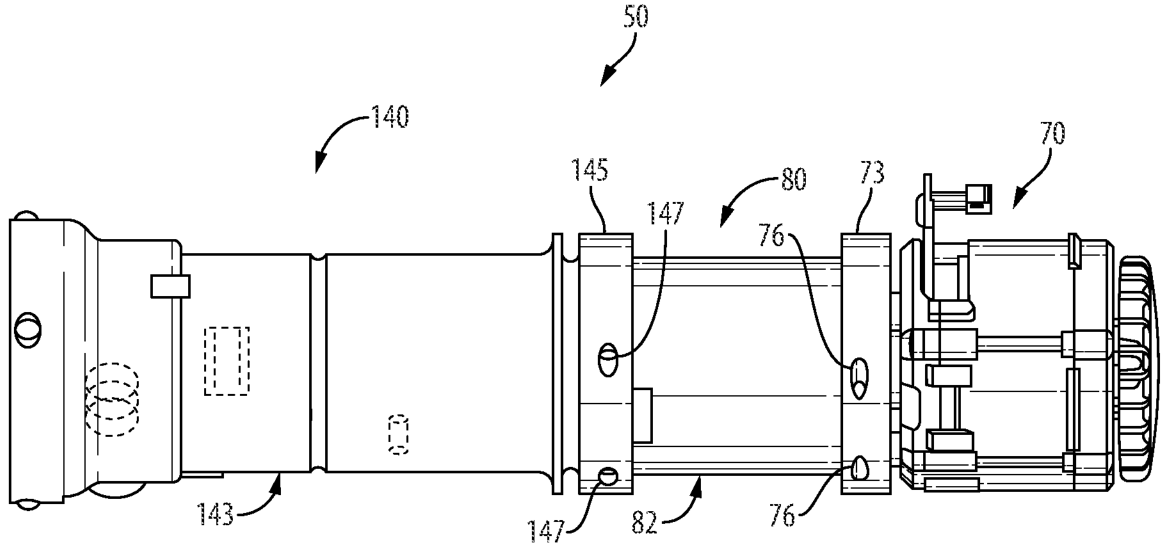
Figure 15:
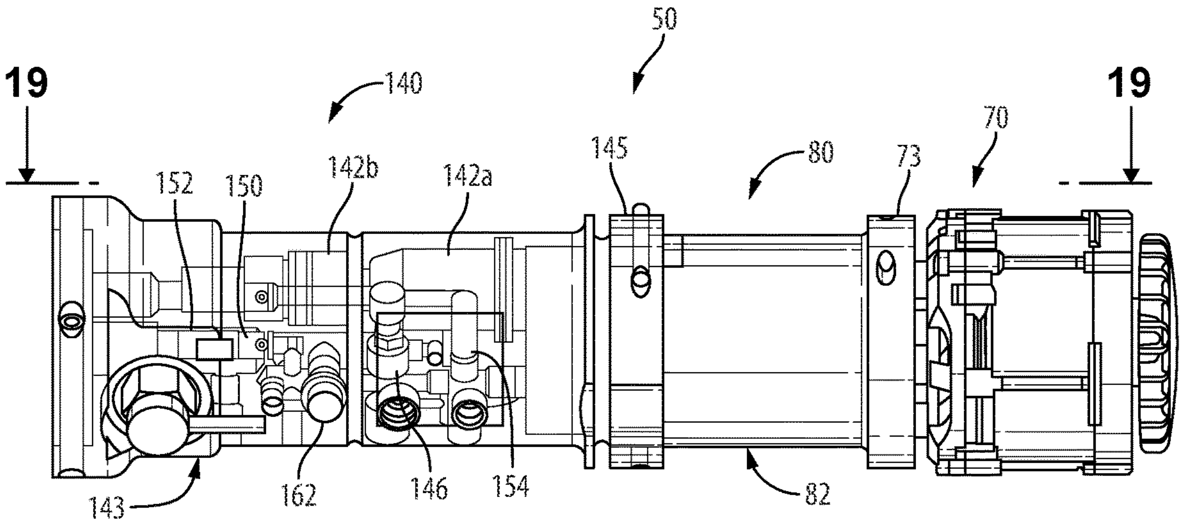
FIGS. 15 and 16 are a third side elevation view of the modular power unit of FIG. 8 rotated approximately 90 degrees from the orientation of the modular power unit of FIGS. 13 and 14.
Figure 16:
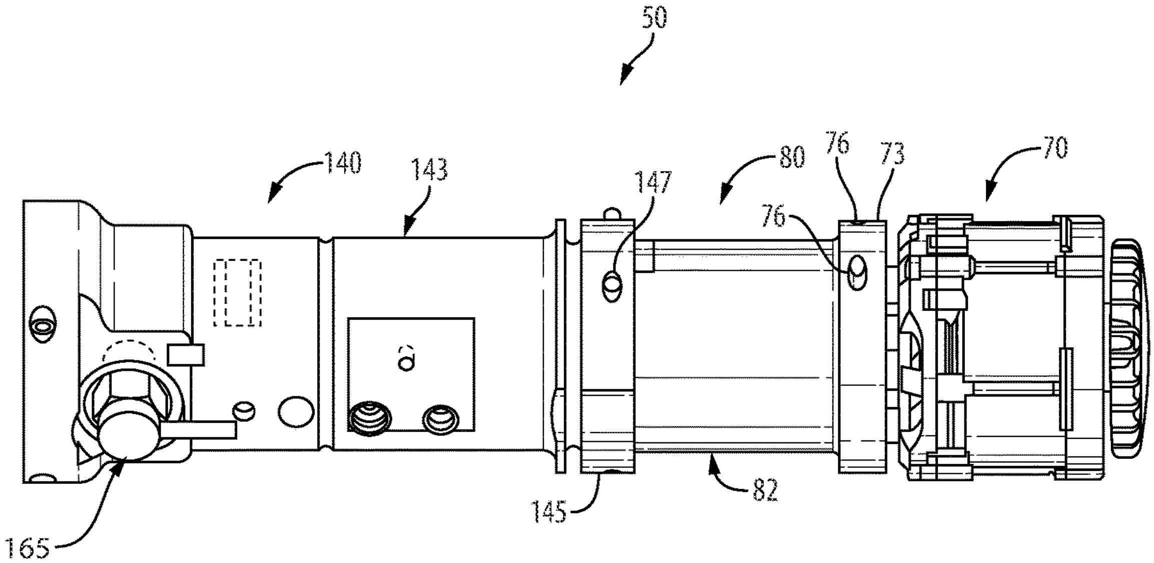
Figure 17:
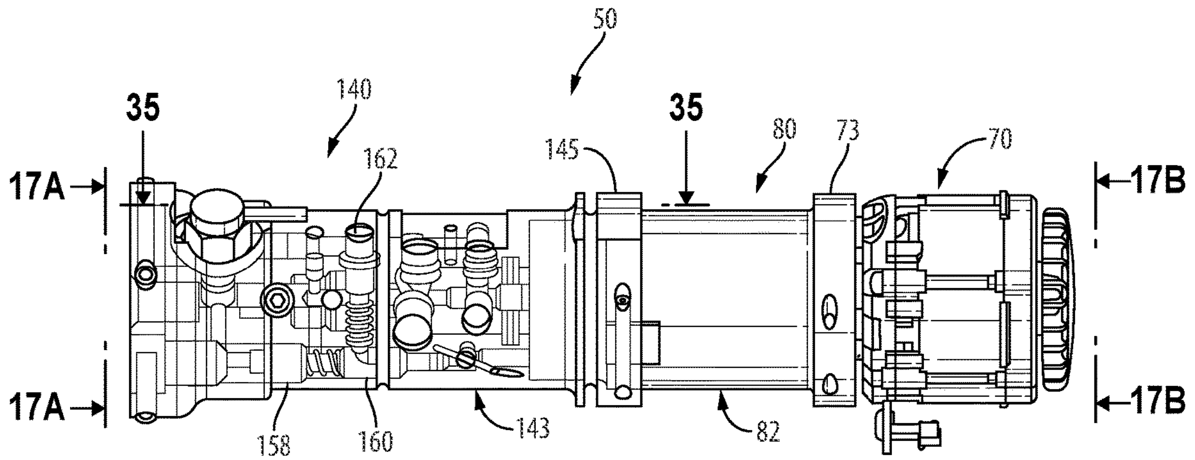
FIGS. 17 and 18 are a fourth side elevation view of the modular power unit of FIG. 8 rotated approximately 90 degrees from the orientation of the modular power unit of FIGS. 15 and 16.
Figure 18:
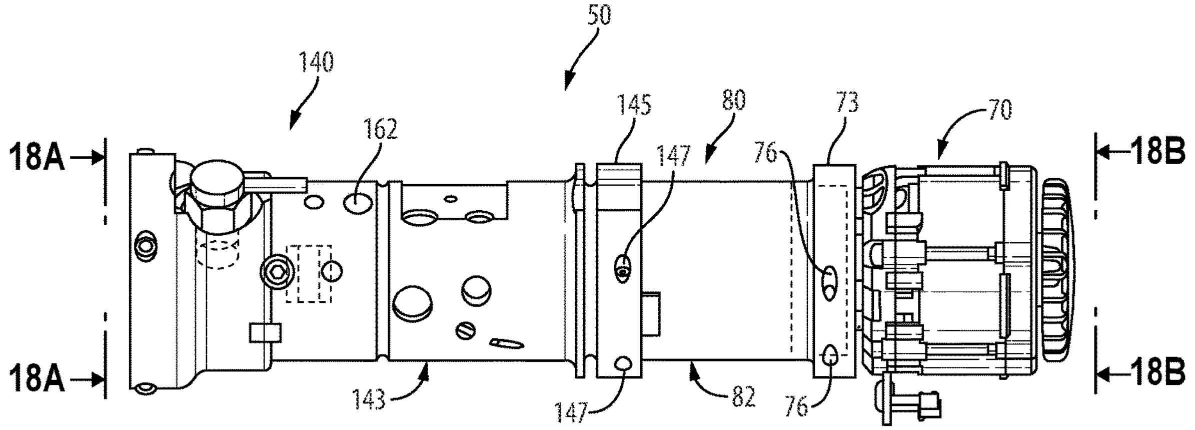
Figure 17A:
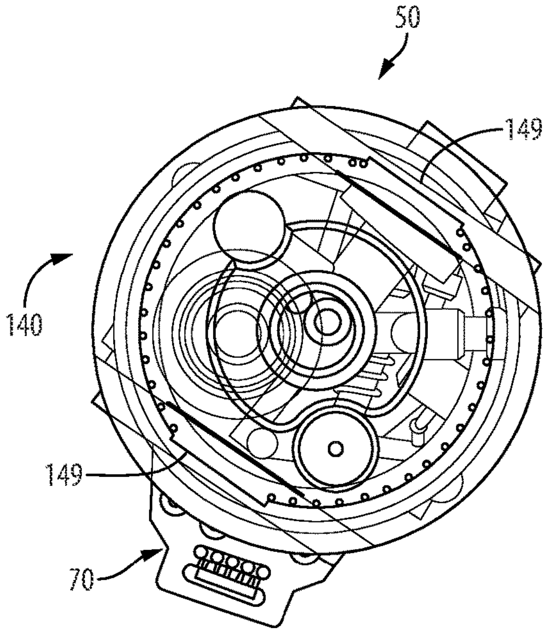
FIG. 17A is an end elevation view of the modular power unit of FIG. 17 taken from line 17A-17A.
Figure 17B:
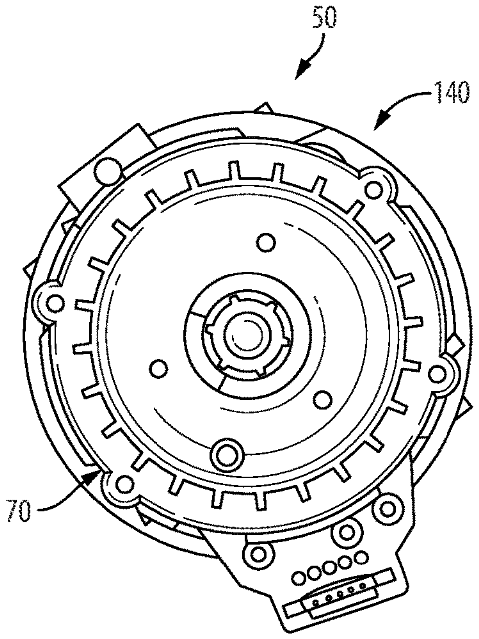
FIG. 17B is an end elevation view of the modular power unit of FIG. 17 taken from line 17B-17B.
Figure 18A:
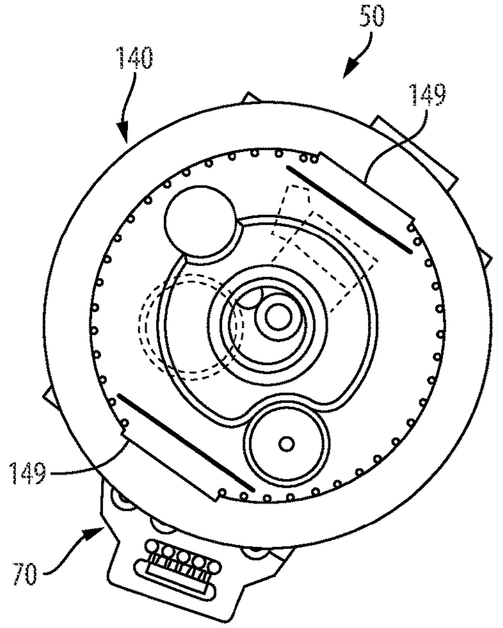
FIG. 18A is an end elevation view of the modular power unit of FIG. 18 taken from line 18A-18A.
Figure 18B:
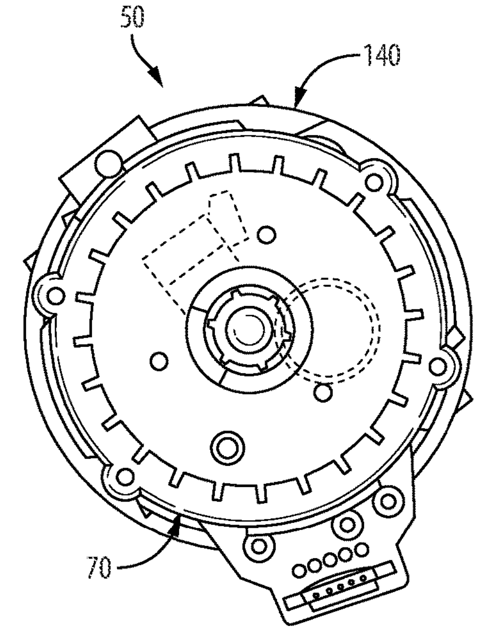
FIG. 18B is an end elevation view of the modular power unit of FIG. 18 taken from line 18B-18B.
Figure 19:
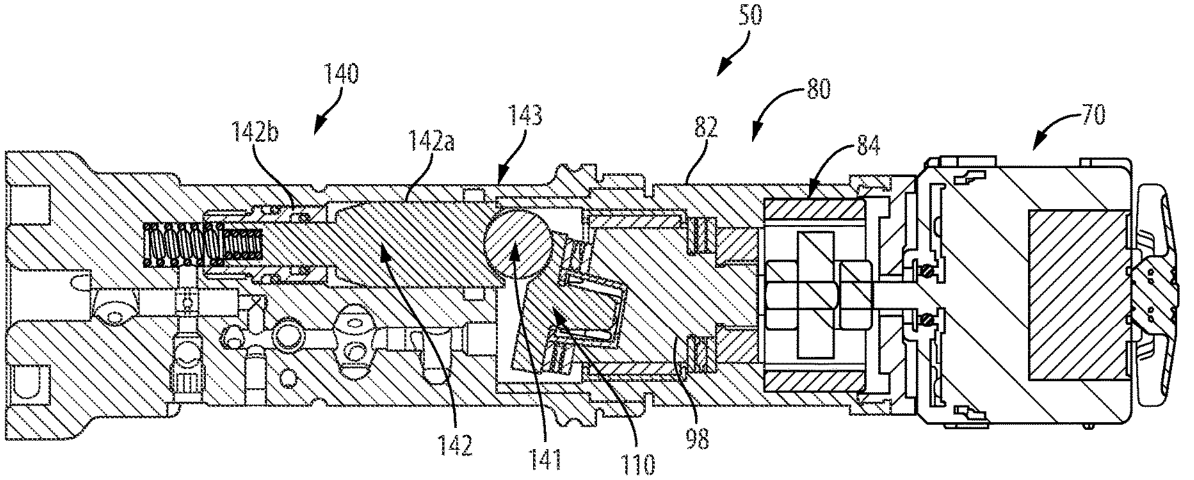
FIG. 19 is a cross-sectional view of the modular power unit of FIG. 15 taken from line 19-19.
Figure 20:
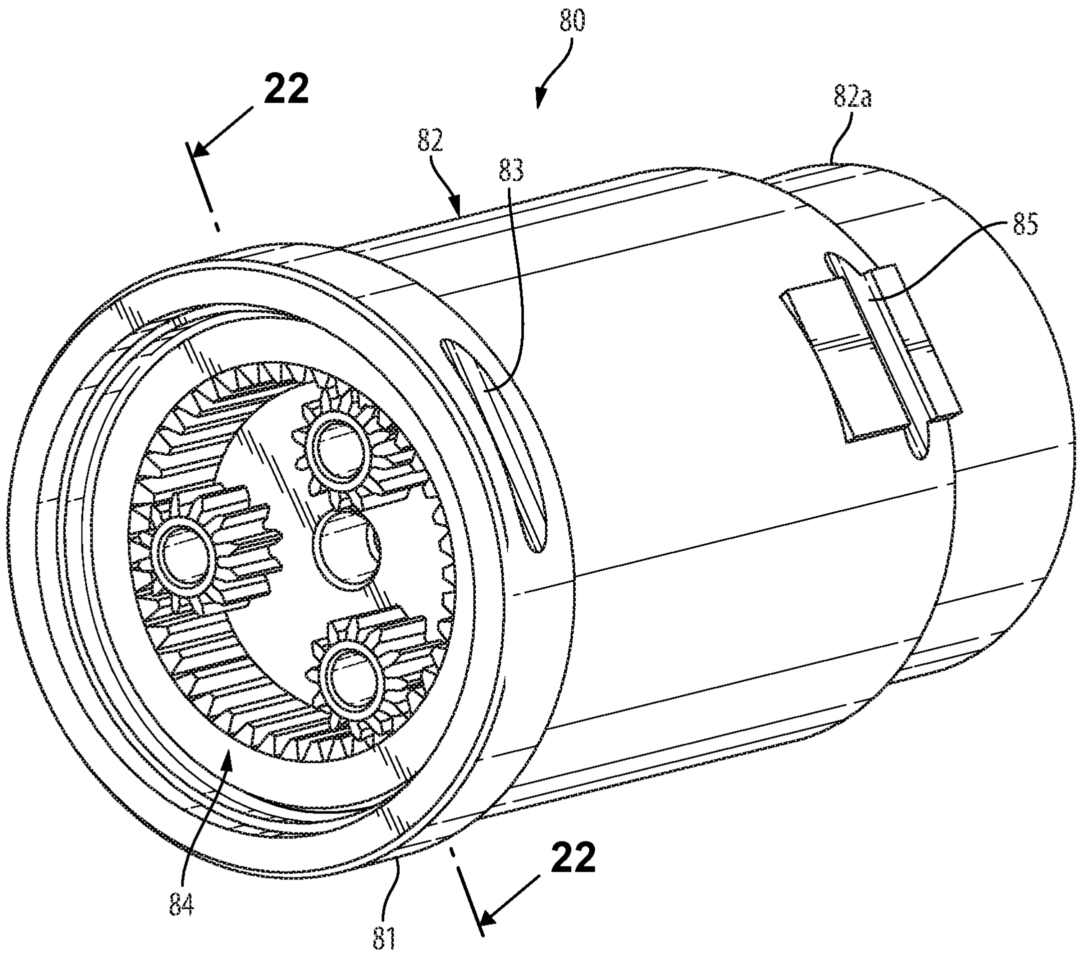
FIG. 20 is a perspective view from a first end of an exemplary embodiment of the transmission assembly according to the present disclosure.
Figure 21:
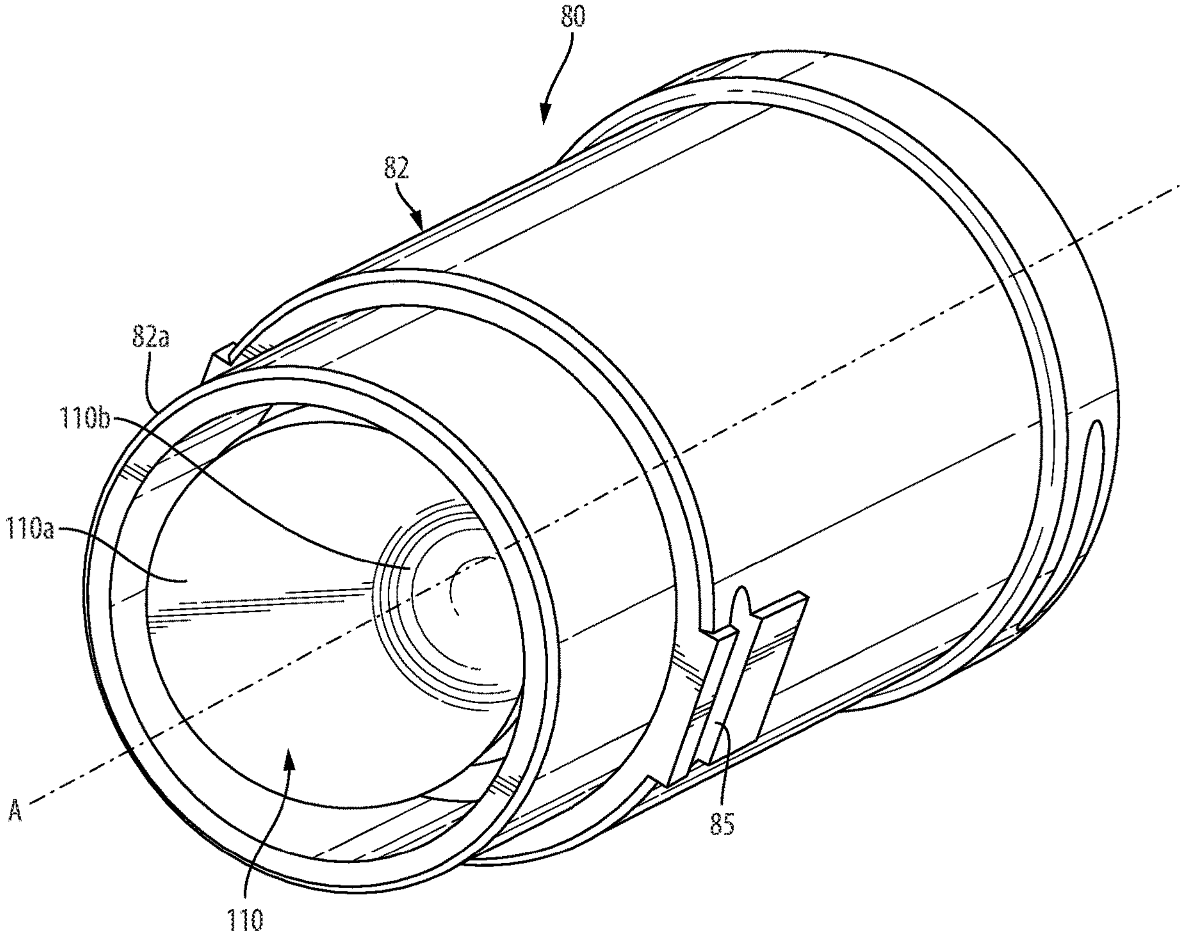
FIG. 21 is a perspective view from a second end of the transmission assembly of FIG. 20.

The motor 70, seen in FIGS. 8 and 9, is an electric brushless motor powered by the battery 60 or other power source. In the embodiment shown, the motor 70 is electrically connected to the battery 60 and the actuators 40 and 42, e.g., trigger switches, seen in FIGS. 1, 4 and 6, and the motor's operation is controlled by the actuators 40 and 42. Generally, the motor 70 is adapted to operate at a nominal voltage corresponding to the voltage of the battery 60, e.g., between about 12 VDC and about 56 VDC. For example, if the battery 60 is adapted to output a voltage of about 24 VDC, then the motor 70 would be adapted to operate at a voltage of about 24 VDC. Under a no-load condition and at 18 VDC, such a motor 70 can operate at about 19,000 rpm with a current of about 3 amps. At maximum efficiency, the motor 70 can operate in a range of about 15,000 rpm to about 18000 rpm with a current at about 17 amps, a torque of about 8.8 in-lb. and an output wattage in a range of about 250 W and about 300 W. However, the motor 70 may be any motor suitable to activate the tool 10. Generally, the motor 70 rotates a motor drive shaft 72 that is coupled to a gear assembly 84, seen in FIG. 22, in the transmission assembly 80, described below.

Referring to FIGS. 20-25, an exemplary embodiment of the transmission assembly 80 according to the present disclosure is shown. In this exemplary embodiment, the transmission assembly 80 has a housing 82, and within the housing 82 is a gear assembly 84 and a pump drive assembly 86. The gear assembly 84 in this exemplary embodiment is a multi-stage gear system 88. Each stage in the gear assembly 84 is preferably a planetary gear assembly that includes a pinion gear, two or more planetary gears, a ring gear and a carrier plate. As an example, in the exemplary embodiment shown a first planetary gear assembly 90 is a first stage (or an input stage), a carrier assembly 92 and a second planetary gear assembly 94 is a second stage (or an output stage). The motor drive shaft (not shown) is coupled to the first planetary gear assembly 90. The output of the first planetary gear assembly 90 is coupled to the carrier assembly 92 via pins 92*a*, and the carrier assembly 92 is coupled to the input of the second planetary gear assembly 94 via a fixed gear 92*b* of the carrier assembly 92. The output of the second planetary gear assembly 94 is coupled to the pump drive assembly 86. In an exemplary embodiment, the pump drive assembly 86 includes a drive member 98, a first bearing system, wobble plate or disc 110, and a second bearing system. Using this exemplary configuration, the output of the second planetary gear assembly 94 would be coupled to the drive member 98 of the pump drive assembly 86. The output of the second planetary gear assembly 94 rotates the drive member 98 at the output rate of the gear assembly 84. The first bearing system is provided so that the drive member 98 can withstand radial and axial loads generated during an operation of the tool 10. In the exemplary embodiment shown, the bearing system includes a thrust bearing 102 and radial bearing 104. The thrust bearing 102 is provided to withstand axial (or thrust) loads on the drive member 98, in the direction of arrow "T" seen in FIG. 22, as the drive member 98 rotates during operation of the tool 10. An example of a suitable thrust bearing 102 is the Koyo Bearing No. NTA613 manufactured by JTEKT North America Corporation. The radial bearing 104 is provided to withstand radial loads on the drive member 98 as it rotates during operation of the tool 10. An example of a suitable radial bearing 104 is the Koyo Bearing No. BK1010 manufactured by JTEKT North America Corporation.

As an example, the motor 70 may be configured to rotate the motor drive shaft (not shown) at a rate in the range of about 15,000 rpm and about 18,000 rpm with an output torque in the range of about 8.8 in-lb. In this configuration, the battery voltage may be in the range of about 12 VDC and about 56 VDC, and the output motor power may be in the range of about 250 watts and about 300 watts. The gear assembly 84 may reduce the rate of rotation of the drive member 98, seen in FIG. 22, and thus reduces the speed of the wobble plate 110 and the speed of the pump 142, seen in FIG. 26, by range of about 10:1 and about 15:1. The output of the gear assembly 84 is transferred to the drive member 98 of pump drive assembly 86. Movement, e.g., rotation, of the shaft 100 is transferred to rotation of the drive member 98. In the exemplary embodiment of the present disclosure, the output of the gear assembly 84 is rotational motion which is transferred to the drive member 98 of the pump drive assembly 86.

Figure 22:
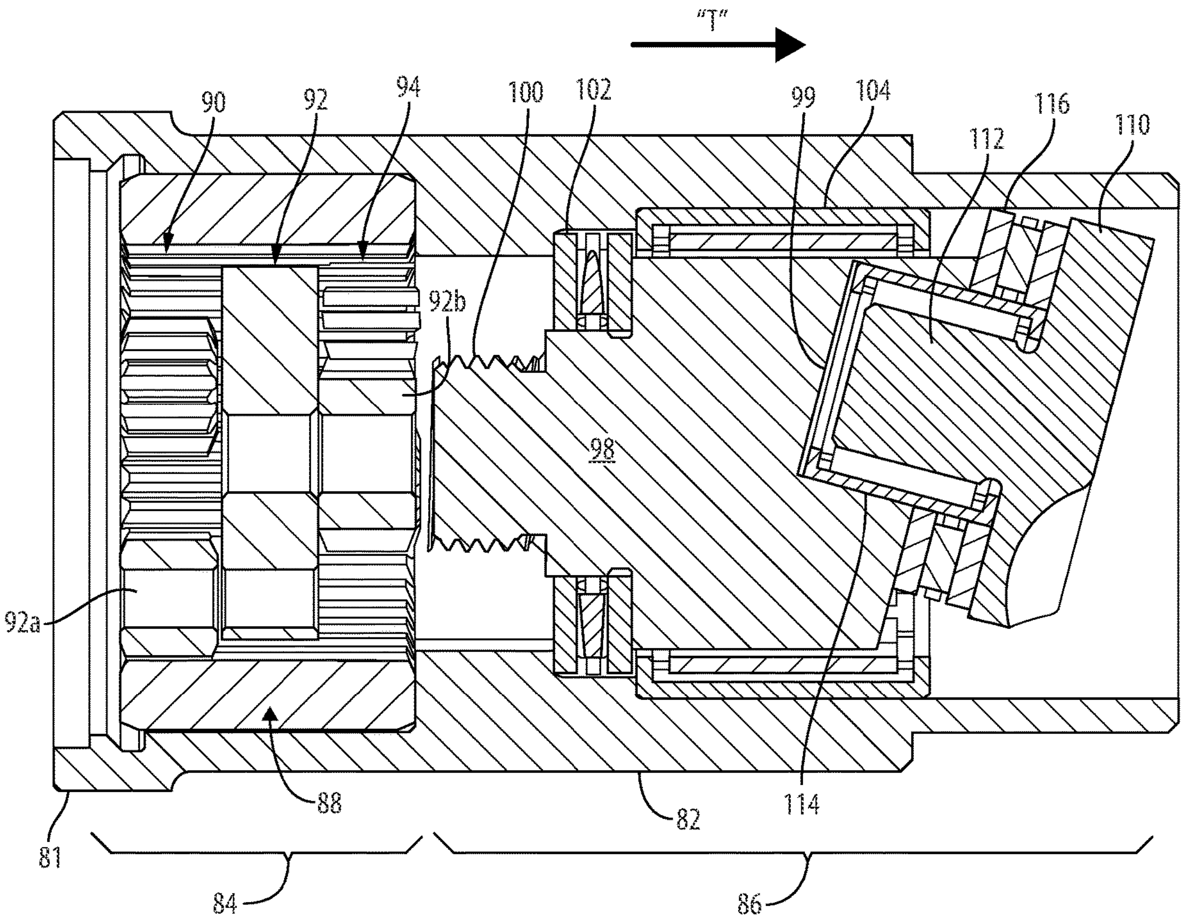
FIG. 22 is a cross-sectional view of the transmission assembly of FIG. 20 taken from line 22-22 and illustrating a gear assembly, a wobble plate drive member and a wobble plate.
Figure 22A:
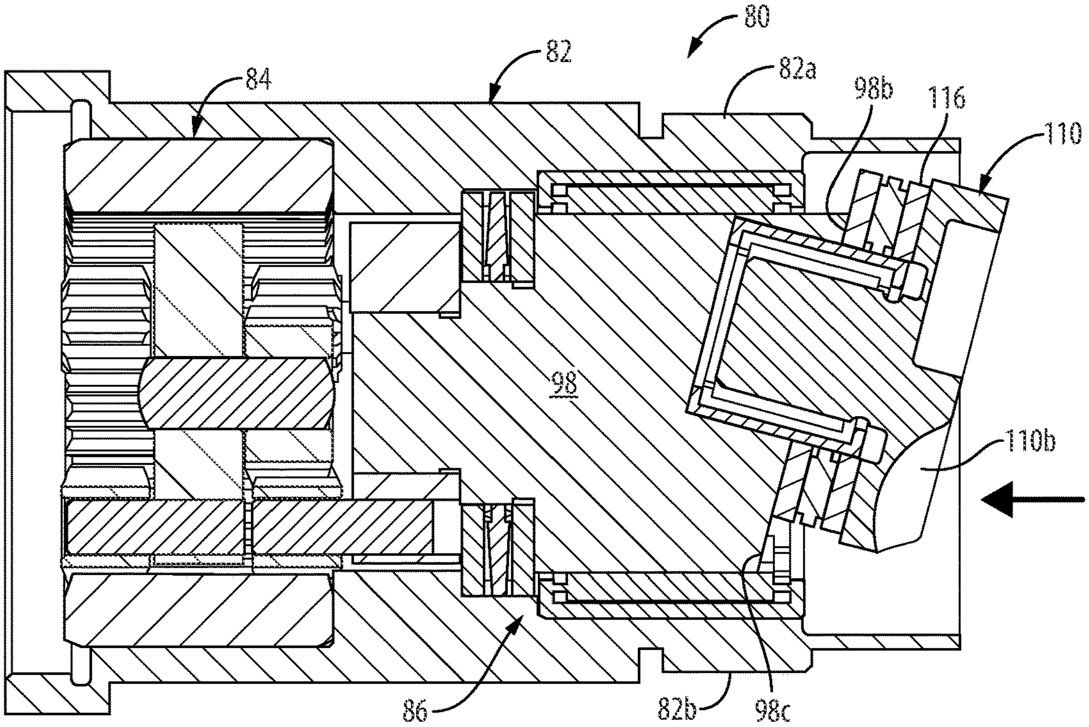
FIG. 22A is a cross-sectional view of the transmission assembly of FIG. 20 similar to FIG. 22, illustrating the wobble plate in a retracted position that coincides with an intake stroke of a pump in the pump assembly.
Figure 22B:
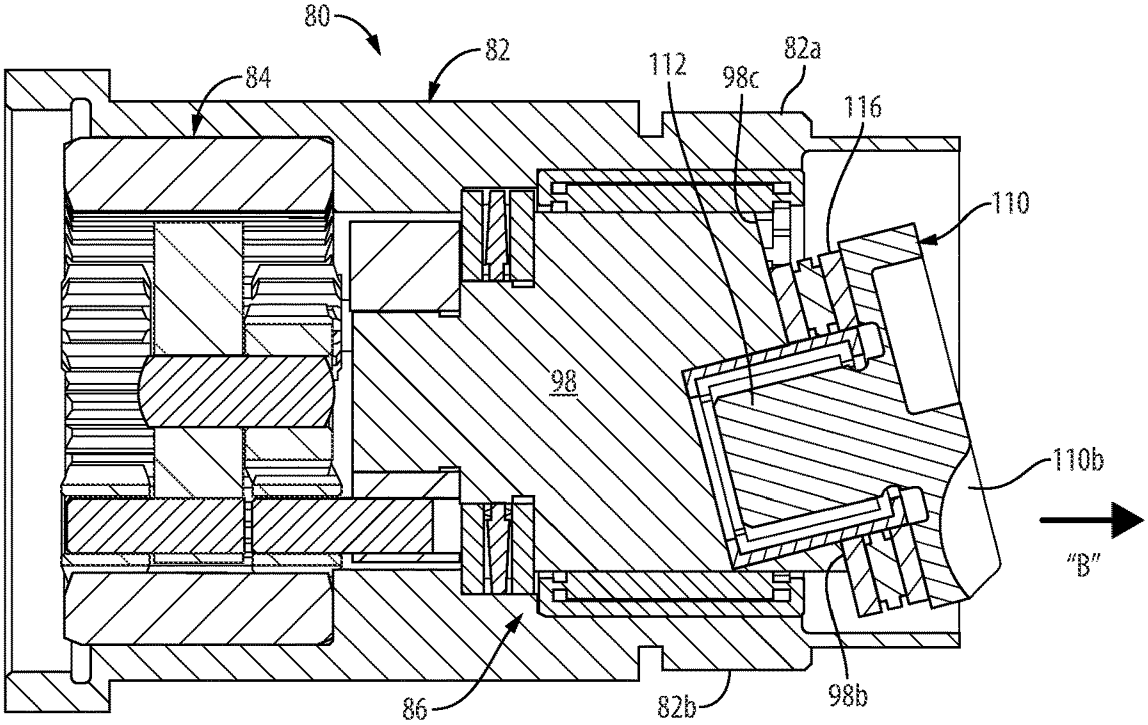
FIG. 22B is a cross-sectional view of the transmission assembly of FIG. 20 similar to FIG. 22, illustrating the wobble plate in an extended position that coincides with an exhaust stroke of the pump in the pump assembly.
Figure 23:
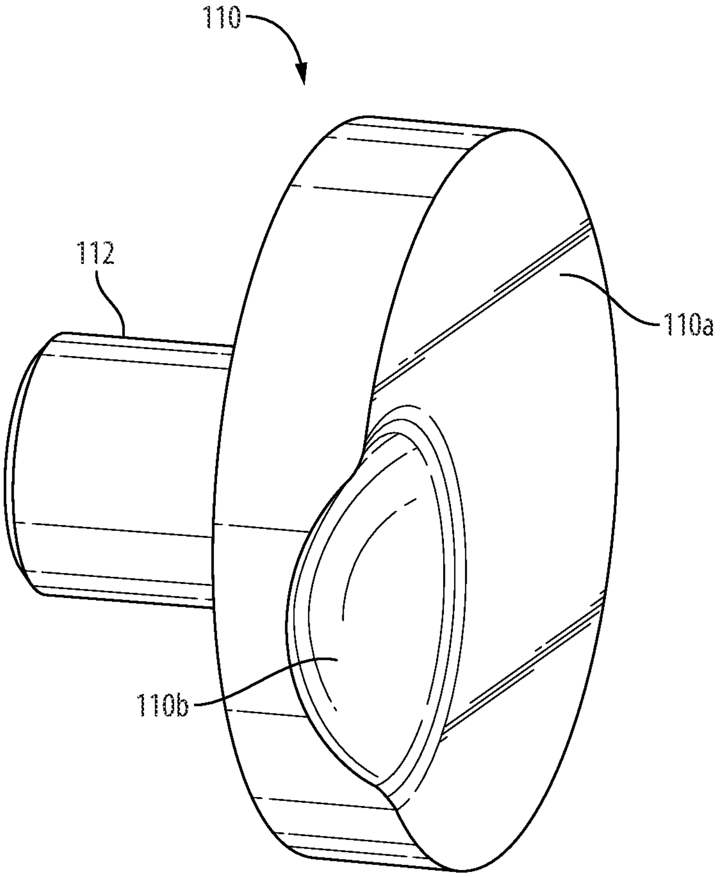
FIG. 23 is a side perspective view of an exemplary embodiment of the wobble plate of the transmission assembly of FIG. 22.
Figure 24:
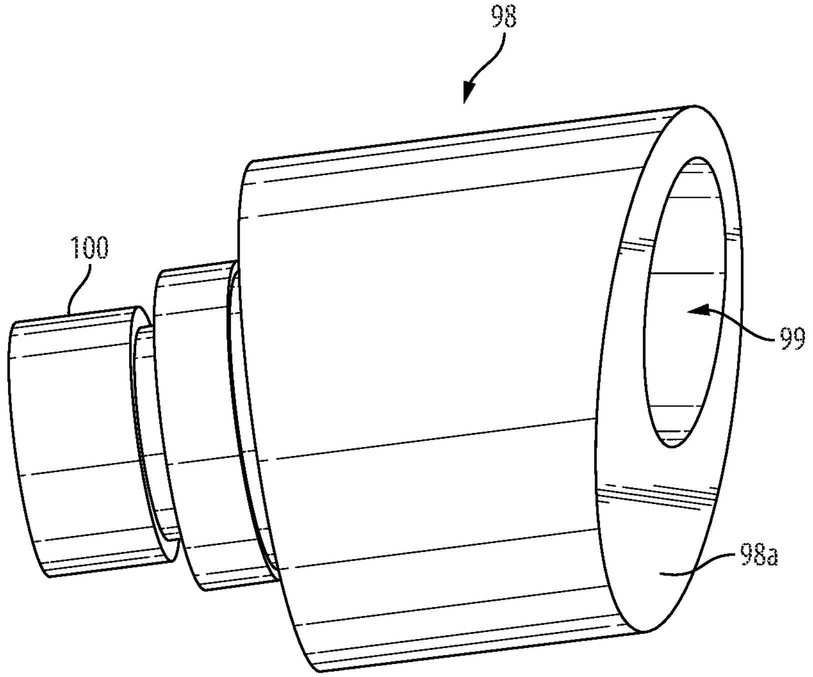
FIG. 24 is a side perspective view of the wobble plate drive member of FIG. 22.
Figure 25:
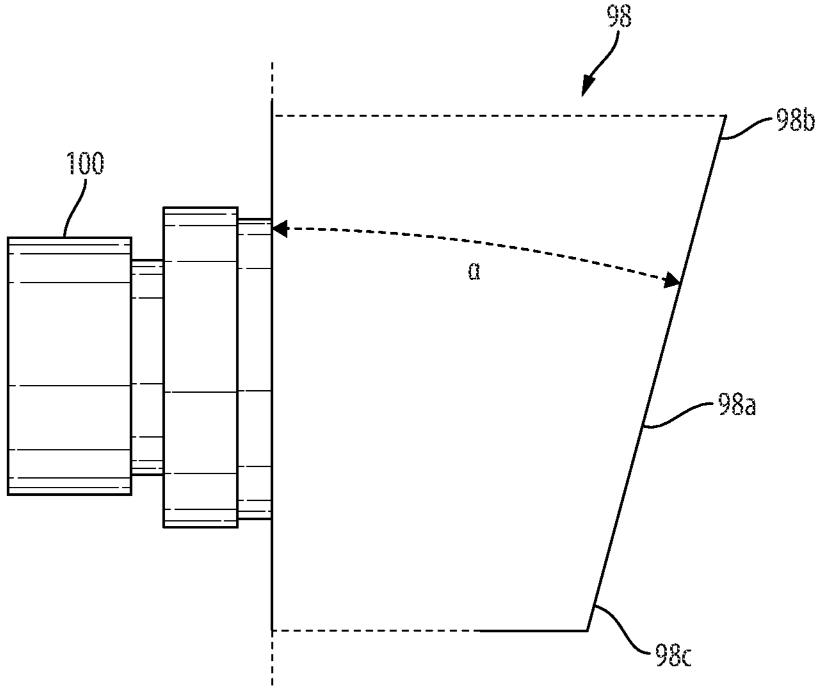
FIG. 25 is a side elevation view of the wobble plate drive member of FIG. 24.
Figure 29:
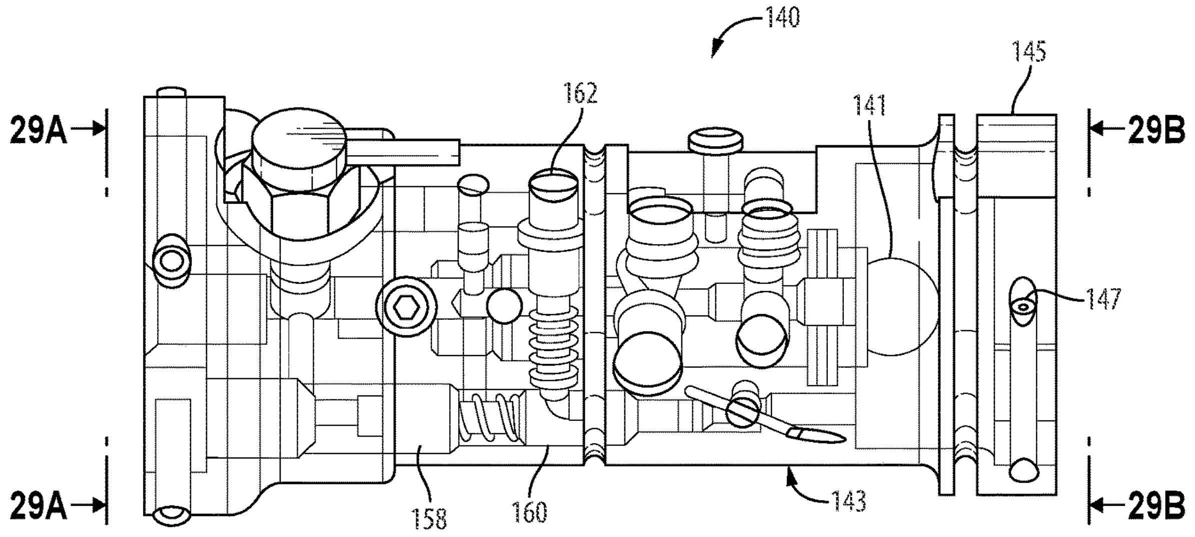
FIG. 29 is a second side elevation view of the pump assembly of FIG. 27 rotated approximately 90 degrees from the orientation of the pump assembly of FIG. 28.
Figure 29A:
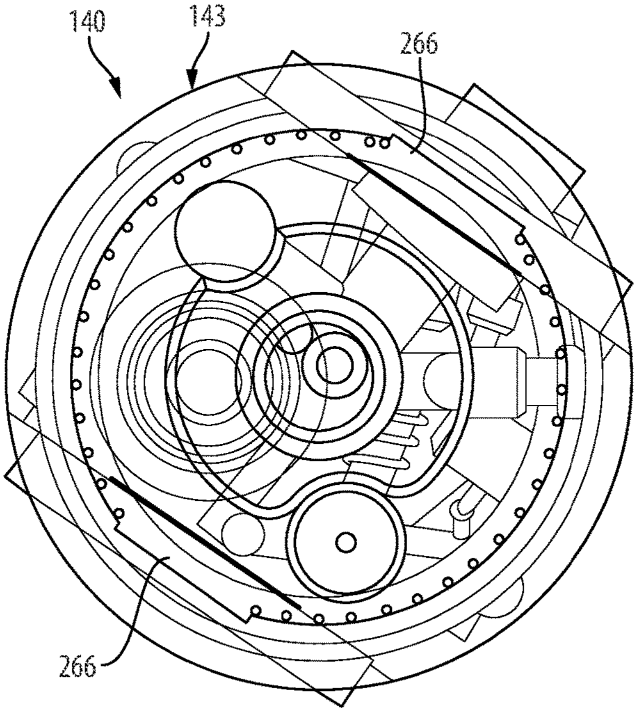
FIG. 29A is an end elevation view of the modular power unit of FIG. 29 taken from line 29A-29A.
Figure 29B:
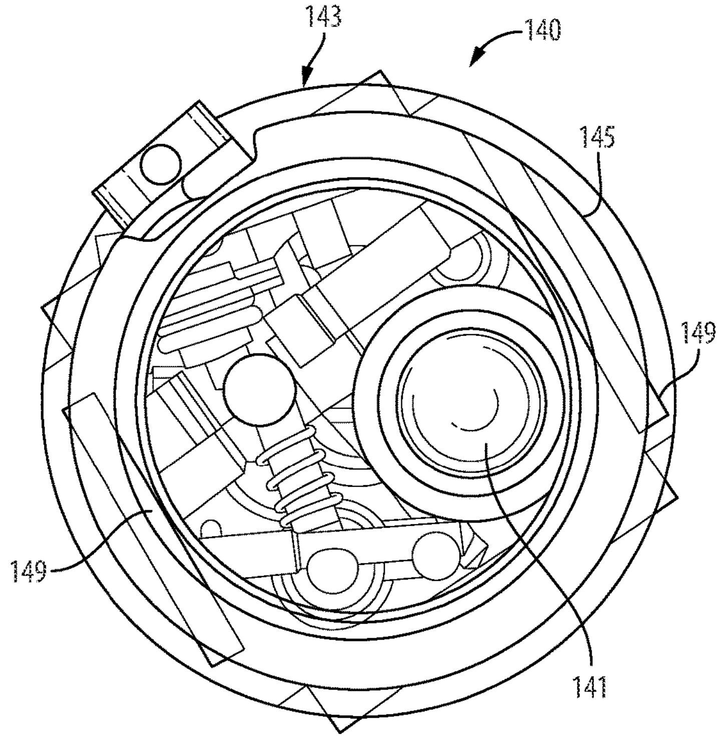
FIG. 29B is an end elevation view of the modular power unit of FIG. 29 taken from line 29B-29B.
Figure 31:
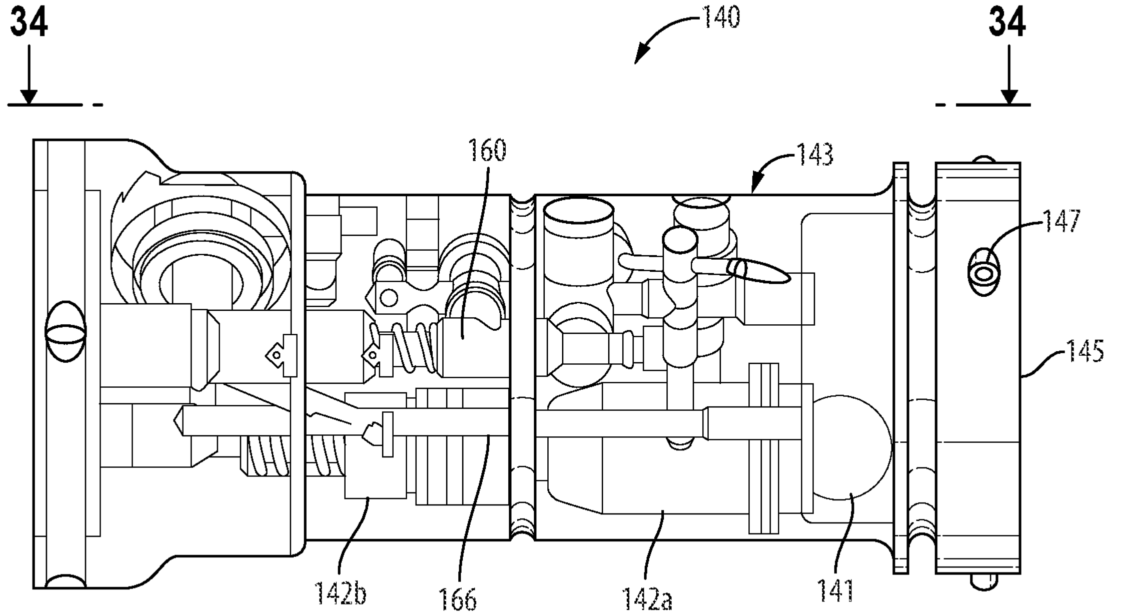
FIG. 31 is a third side elevation view of the pump assembly of FIG. 27 rotated approximately 90 degrees from the orientation of the pump assembly of FIG. 29.
Figure 32:
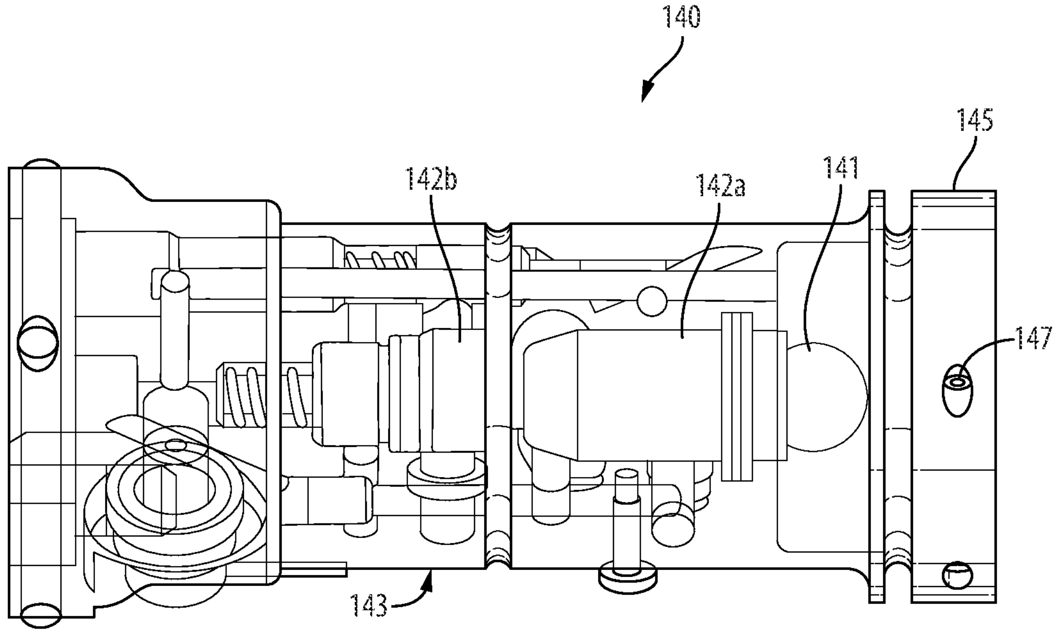
FIG. 32 is a fourth side elevation view of the pump assembly of FIG. 27 rotated approximately 90 degrees from the orientation of the pump assembly of FIG. 31.
Figure 33:
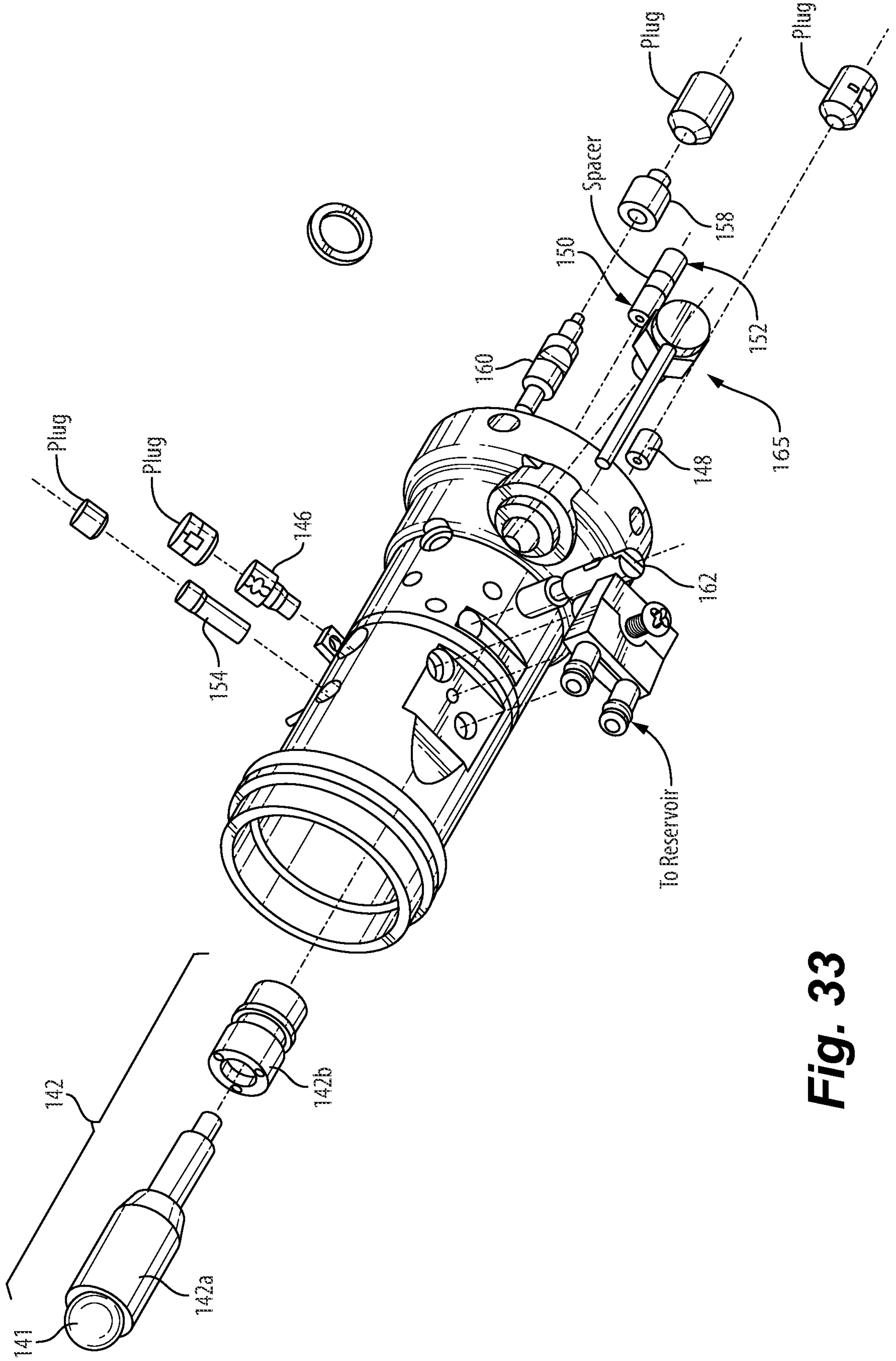
FIG. 33 is an exploded perspective view of the pump assembly of FIG. 27.
Figure 34:
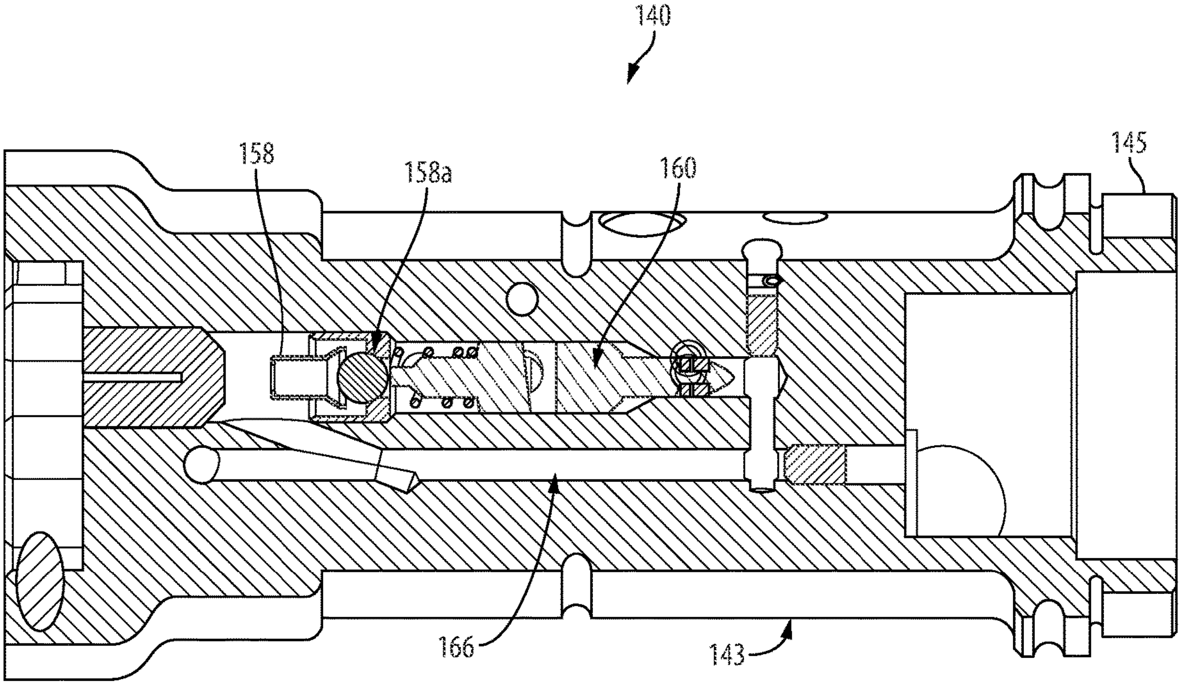
FIG. 34 is a cross-sectional view of the pump assembly of FIG. 31 taken from line 34-34, illustrating a pressure balance system of the pump assembly.

Referring to FIGS. 21-25, the face 98*a* of the drive member 98 is opposite the shaft 100 and is angled to translate rotational movement of the drive member 98 to reciprocal linear movement of the wobble plate or disc 110 of the pump drive assembly 86. Preferably, the angle "a" of the face 98*a* of the drive member 98 is about 14.5 degrees. However, the angle "a" may be set to other angles. Further, the wobble plate 110 is mounted to the drive member 98 at an offset from the center axis "A," seen in FIG. 21, of the transmission assembly 80. More specifically, the wobble plate 110 includes a mounting arm 112 that is inserted into a needle bearing 114 positioned within a mounting hole 99 in the drive member 98, seen in FIGS. 24 and 25. The needle bearing 114 is provided to permit the wobbler plate 110 to float freely relative to the drive member 98 and to withstand radial loads on the wobble plate 110 as the drive member 98 rotates during operation of the tool 10. Between the wobble plate 110 and face 98*a* of the drive member 98 is a thrust bearing 116. The thrust bearing 116, seen in FIG. 22, is provided to withstand axial (or thrust) loads on the wobble plate 110 in the direction of arrow "T" as the drive member 98 rotates during operation of the tool 10. The needle bearing 114 and the thrust bearing 116 form the second bearing system of the pump drive assembly 86. An example of a suitable thrust bearing 116 is the Koyo Bearing No. NTA613 manufactured by JTEKT North America Corporation. The face 110*a*, seen in FIG. 23, of the wobble plate 110 includes a recess 110*b* in which a ball bearing 141, seen in FIG. 29B, of the pump assembly 140 rests. The recess 110*b* is offset from the center axis "A" of the transmission assembly 80 such that rotation of the drive member 98 is translated to reciprocal linear movement of the wobble plate 110 and thus the ball bearing 141 of the pump assembly 140. As an example and referring to FIGS. 22A, 22B, 24 and 25, with a surface 98*b* of the face 98*a* of the drive member 98 initially at about a top side 82*a* of the housing 82, seen in FIG. 22A, the recess 110*b* in the wobble plate 110 is in a retracted position. When the drive member 98 rotates from this initial position, the surface 98*b* of the face 98*a* rotates along with the thrust bearing 116 causing the recess 110*b* in the wobble plate 110 to move linearly in the direction of arrow "B," seen in FIG. 22B. When the drive member 98 rotates approximately 180 degrees, the surface 98*b* of the face 98*a* is now at about a bottom side 82*b* of the housing 82, seen in FIG. 22B, causing the recess 110*b* in the wobble plate 110 to be in a fully extended position. Further rotation of the drive member 98 from the 180 degree fully extended position to the 360 degree position returns the recess 110*b* in the wobble plate 110 to the retracted position, seen in FIG. 22A. As described in more detail below, the continuous movement of the wobble plate 110 between the retracted position and the fully extended position causes the ball bearing 141 to reciprocate in a liner motion creating a pump movement of about 0.15 inch and about 0.20 inch of total travel.

Pump Assembly

Figure 26:
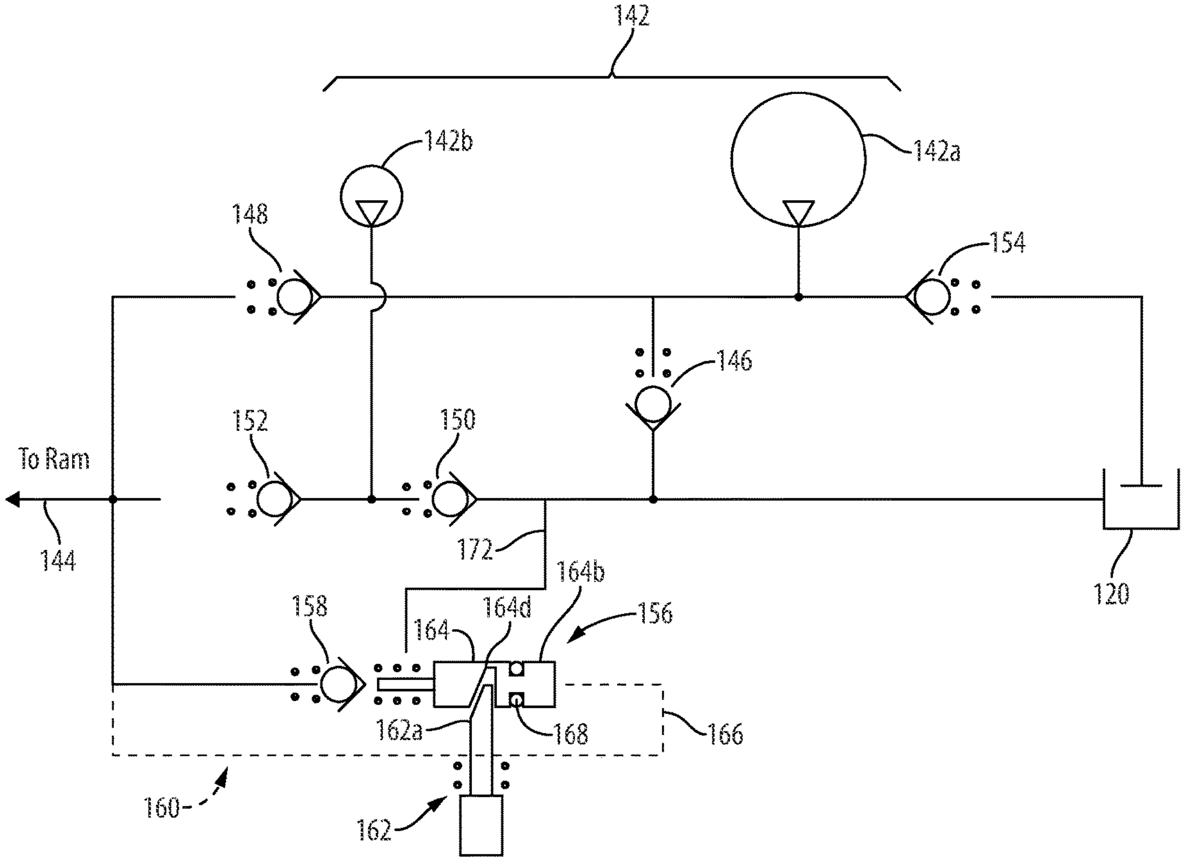
FIG. 26 is a schematic representation of an exemplary embodiment of the pump assembly according to the present disclosure.
Figure 27:
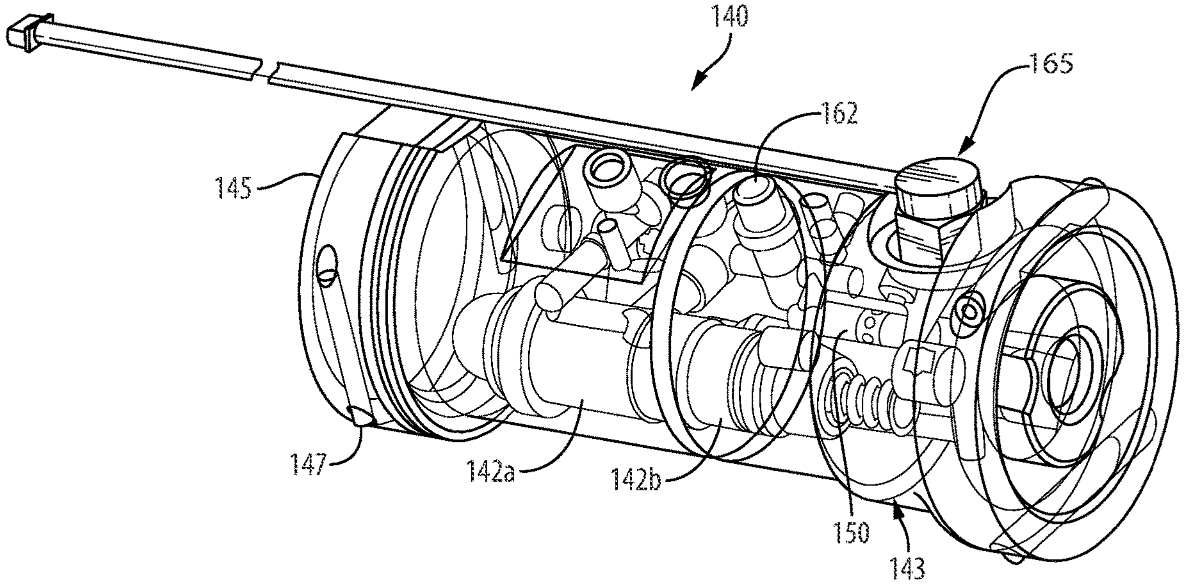
FIG. 27 is a perspective view of an exemplary embodiment of the pump assembly according to the present disclosure, illustrating an electrical cable used to connect a sensor of the pump assembly to a controller within the handle assembly.
Figure 28:
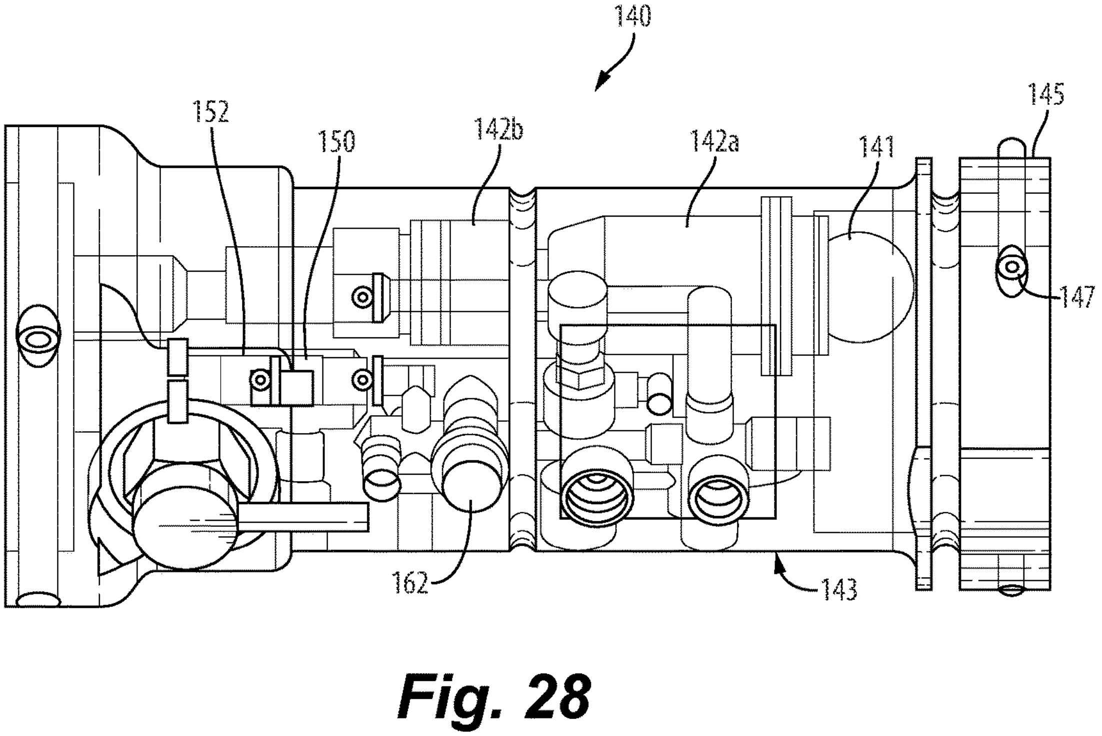
FIG. 28 is a side elevation view of the pump assembly of FIG. 27 without the electrical cable, illustrating the sensor extending from a housing of the pump assembly.
Figure 30:
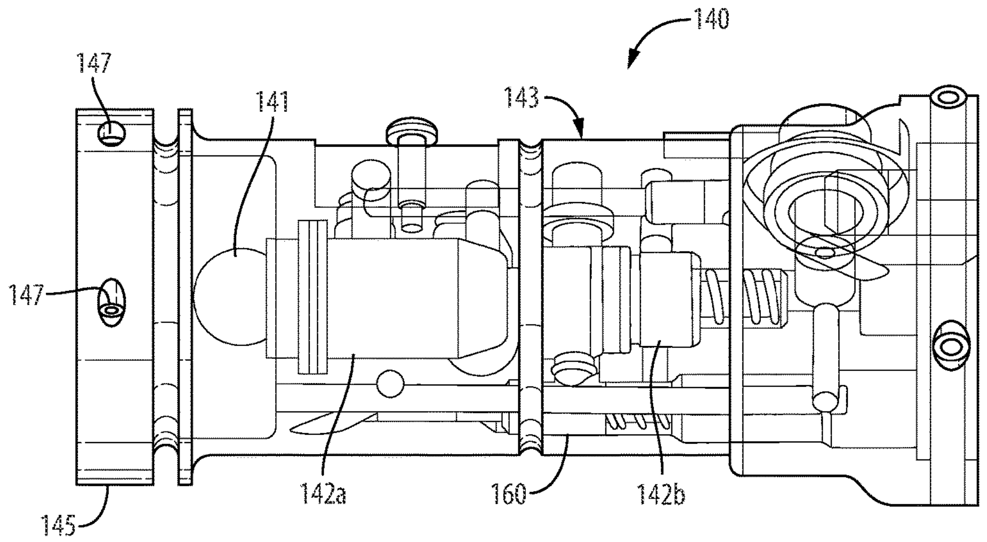
FIG. 30 is a side elevation view of the pump assembly of FIG. 29 rotated about an axis transverse to a longitudinal axis of the pump assembly.
Figure 35:
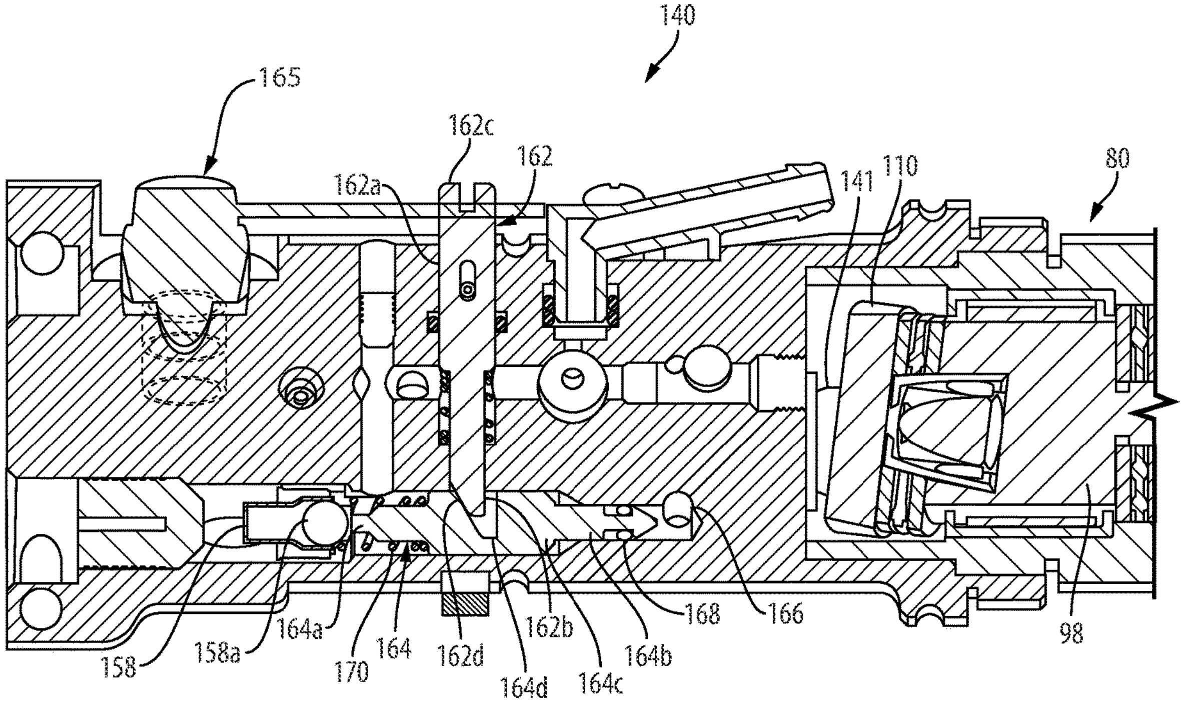
FIG. 35 is a cross-sectional view of the pump assembly of FIG. 17 taken from line 35-35, illustrating the pressure balance valve of the pump assembly.
Figure 36:
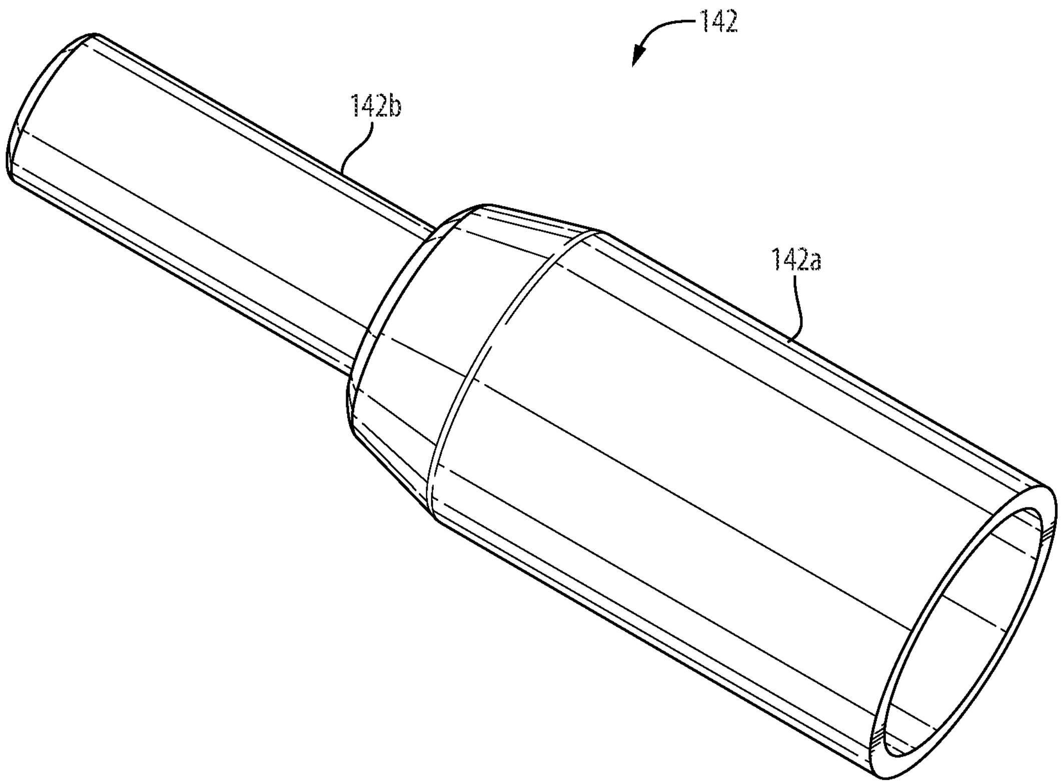
FIG. 36 is a perspective view of an exemplary embodiment of a two stage pump of the pump assembly.

Referring to FIGS. 26-36, an exemplary embodiment of the pump assembly 140 according to the present disclosure is shown. The pump assembly 140 has a housing 141. The pump assembly 141 includes a pump 142, a low-pressure inlet check valve 146, a low-pressure outlet check valve 148, a high-pressure inlet check valve 150, a high-pressure outlet check valve 152, a low-pressure bypass valve 154, a spool plunger assembly 156 and a drain check valve 158. The pump 142, low-pressure inlet check valve 146, low-pressure outlet check valve 148, high-pressure inlet check valve 150, high-pressure outlet check valve 152, low-pressure bypass valve 154, spool plunger assembly 156 and drain check valve 158 along with other components of the pump assembly 140 are housed in the housing 141. The pump 142 is a two-stage reciprocating hydraulic piston pump. The pump 142 is shown schematically in FIG. 26. Preferably, the pump 142 operates at about 10,000 psi. The pump 142 is a stepped design, combining both a low pressure pump (a first stage) 142*a* and a high pressure pump (a second stage) 142*b* into a single component or housing as shown in FIG. 36. The schematic representation of the pump 122, seen in FIG. 26, shows the low pressure pump 142*a* and the high pressure pump 142*b* separated for simplicity of interpretation. However, the two pumps 142*a* and 142*b* are preferably a single component and move together in a reciprocating motion.

As noted above, continuous movement of the wobbler plate 110 between the retracted position and the fully extended position causes the ball bearing 141 to activate the pump 142 in a liner, reciprocating fashion. Generally, when the pump 142 reciprocates, hydraulic fluid is pumped (or moved) from the reservoir 120, seen in FIGS. 1, 5 and 26, to the ram drive fluid conduit 144, shown in the fluid circuit schematic of FIG. 26, to supply hydraulic fluid to the working head piston assembly 230. More specifically, on the intake stroke of the pump 142, the low pressure pump 142*a* draws fluid from the reservoir 120 through the low-pressure inlet check valve 146. On the exhaust stroke of the pump 142, the low-pressure pump 142*a* pushes hydraulic fluid through the low-pressure outlet check valve 148 into the ram drive fluid conduit 144. In unison with the low-pressure pump 142*a*, on the intake stroke of the pump 142, the high pressure pump 142*b* draws hydraulic fluid from the reservoir 120 through the high-pressure inlet check valve 150. On the exhaust stroke of the pump 142, the high pressure pump 142*b* pushes hydraulic fluid through the high-pressure outlet check valve 152 into the ram drive fluid conduit 144.

Figure 41:
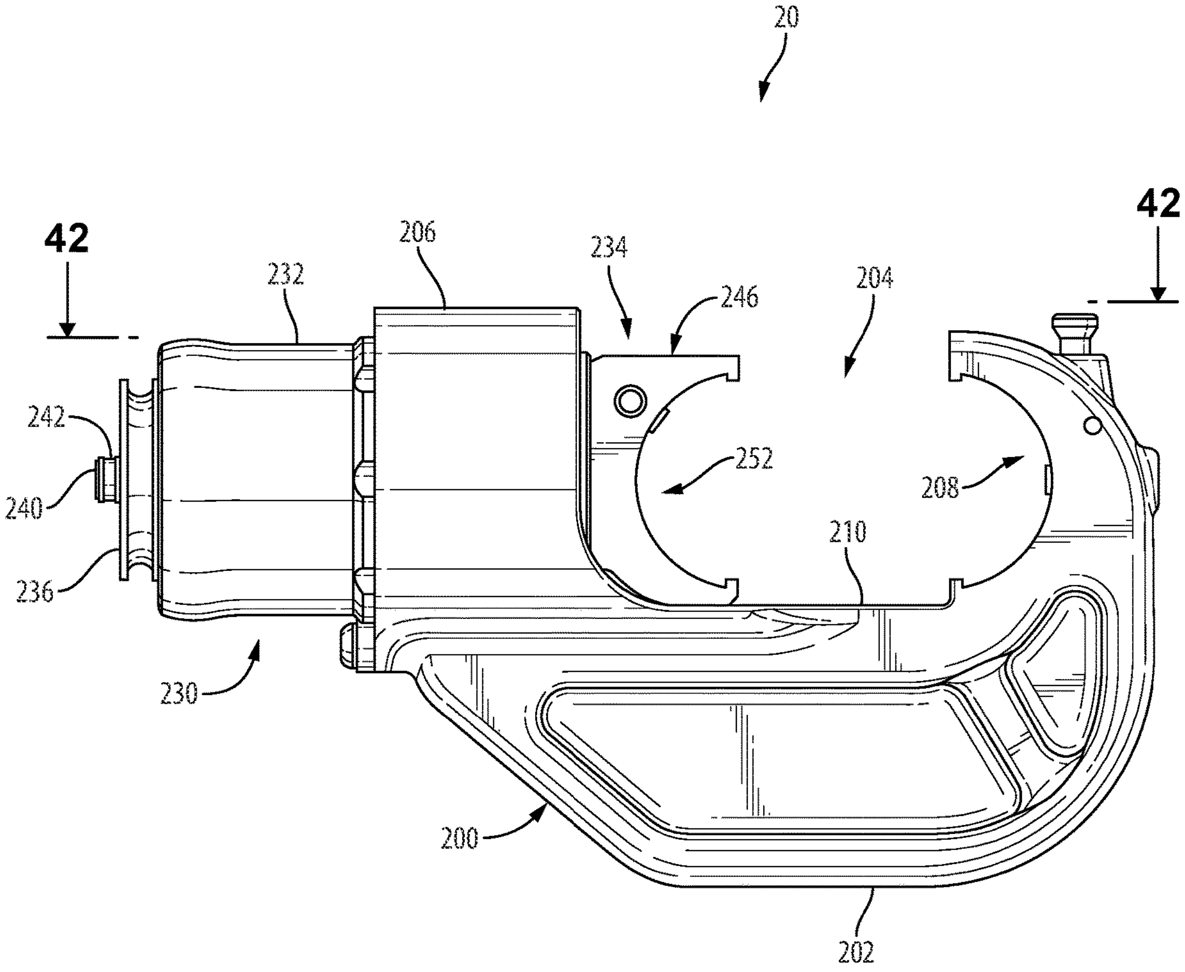
FIG. 41 is a first side elevation view of an exemplary embodiment of the modular working head assembly of the portable, hand-held hydraulic tool of FIGS. 1 and 6.

During a cycle of the tool 10, e.g., a crimping cycle or a cutting cycle, the piston assembly 230, seen in FIG. 41, of the working head 20 initially moves a ram 246 rapidly toward is full operating position, e.g., its crimping or cutting position, as a result of the low and high pressure pumps 142*a* and 142*b* moving the maximum amount of hydraulic fluid from the reservoir 120 to the piston assembly 230 via the ram drive fluid conduit 144. However, when the ram 246 encounters a workpiece between jaws or dies of the working head 20, the pressure against the ram 246 quickly increases. With the increase in pressure imposed on the ram 246 by the workpiece, the motor 70 may begin to overload because of the increase pressure on the low-pressure pump 142*a*, which is the larger diameter pump. To limit or remove the pressure on the low-pressure pump 142*a*, the low-pressure by-pass valve 154 activates to permit hydraulic fluid to flow back into the reservoir 120. More specifically, the low-pressure by-pass valve 154 is preconfigured to open and close when the pressure on the low-pressure pump 142*a* reaches a predefined pressure level. Preferably, the predefined pressure level is about 600 psi. When the pressure on the low-pressure pump 142*a* reaches the predefined pressure level, with each stroke of the pump 142, the low-pressure by-pass valve 154 opens and closes permitting hydraulic fluid to flow back into the reservoir 120. In other words, fluid pressure in excess of the predefined pressure level is diverted back to the reservoir 120 by diverting (or dumping) the hydraulic fluid from the low-pressure pump 142*a* back into the reservoir 120 instead of pushing the hydraulic fluid from the low-pressure pump 142*a* to the ram drive fluid conduit 144. As a result, the motor 70 drives the high-pressure pump 142*b* to a preferred pressure value of about 10,000 psi without overloading the motor 70 and the transmission assembly 80. When the motor 70 drives the high-pressure pump 142*b* to the preferred pressure value, the controller 300 may sense the preferred pressure value has been reached using, for example, a pressure sensor 165 operatively coupled to the pump assembly 140 and the controller 300, seen in FIG. 33. When the controller 300 senses that the preferred pressure value has been reached, the controller 300 activates an indicator signal generator 302, shown in FIG. 50, to provide an audible indication to the operator that the preferred pressure value has been reached so that the operator knows that the operation of the working head has completed. In addition, the controller 300 may activate the indicator signal generator 302, shown in FIG. 50, to provide a visible indication to the operator that the preferred pressure value has been reached so that the operator knows that the operation of the working head has completed.

Figure 37:
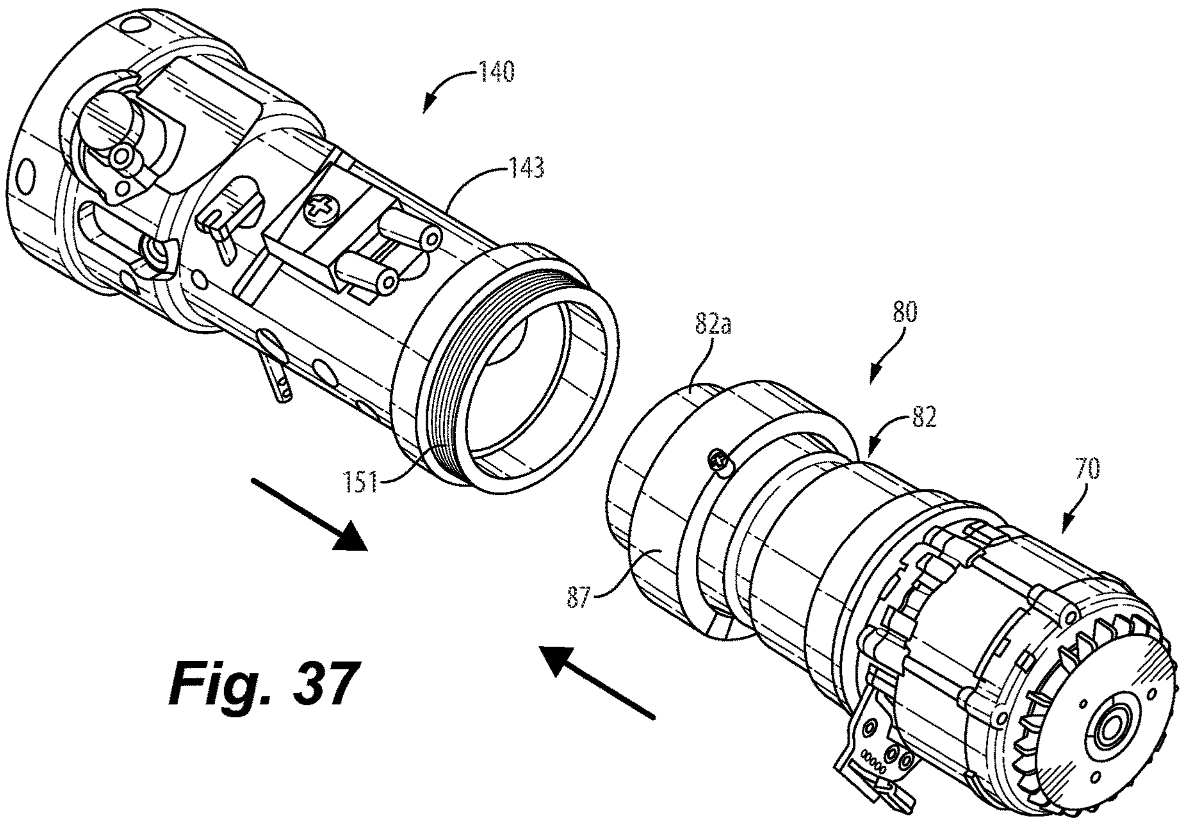
FIG. 37 is an exploded perspective view of another exemplary embodiment of the modular power unit of FIG. 8, illustrating a male threaded end of the pump assembly configured to connect to a female threaded collar of the transmission assembly.
Figure 38:
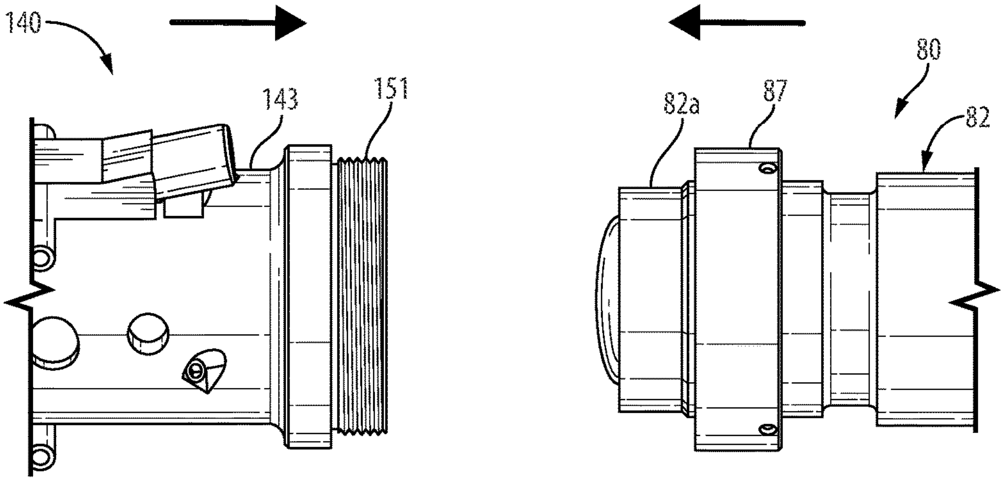
FIG. 38 is a side elevation view of a portion of the male threaded end of the pump assembly configured to connect to the female threaded collar of the transmission assembly.
Figure 39:
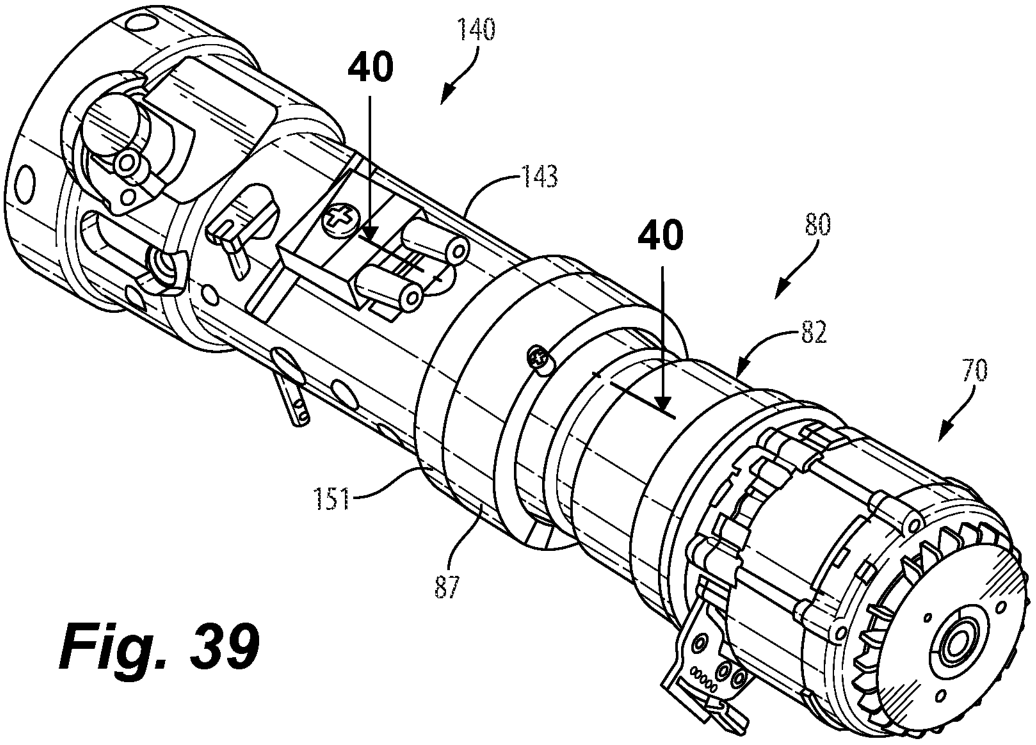
FIG. 39 is a perspective view of the modular power unit of FIG. 37, illustrating the male threaded end of the pump assembly connected to the female threaded collar of the transmission assembly.

After the fluid circuit has achieved full pressure, e.g., about 10,000 psi, the tool operating cycle is complete. The piston 254 and thus the ram 246 of the piston assembly 230, seen in FIGS. 37 and 38, of the working head 20 is then returned to its at rest (or home) position by draining the high-pressure fluid in the ram drive fluid conduit 144 into the reservoir 120 in preparation for the next operating cycle of the tool 10. Draining the hydraulic fluid from the ram drive fluid conduit 144 is achieved by activating a spool plunger assembly 156. The spool plunger assembly 156 includes a release member 162 and a plunger 164. It is noted that in the embodiment shown, the release member 162 is a mechanically activated release member. In the embodiment shown, the release member 162 is activated by activating the operator control 40. More specifically, and referring to FIGS. 1-3, 5, 6, 26 and 35, activating the operator control 40 causes an activating arm 45 of the operator control 40 to depress the release member 162. Other types of release members are also contemplated by the present disclosure, such as an electro-mechanical activated release member or a cable release member. As shown in FIG. 35, the plunger 164 has a tip portion 164*a*, an end portion 164*b* and a main body 164*c* between the tip portion 164*a* and the end portion 164*b*. The plunger 164 is positioned within a cavity in a housing of the pump assembly 140 and is operatively coupled to the release member 162 as described below. To activate the spool plunger assembly 156, the operator control 40 is activated causing the activating arm 45 to depress the release member 162. The release member 162 is configured to act on the plunger 164 such that the plunger 164 moves toward the drain check valve 158 to open the drain check valve. More specifically, the release member 162 has a stem 162*a* with a proximal end 162*c* that is at least partially accessible from an exterior of the housing of the pump assembly 140. The stem 162*a* has a tip 162*b* with an angled surface 162*d* that is configured to fit within a V-shaped like notch 164*d* in the main body 164*c* of the plunger 164. When the release member 162 is actuated, e.g., mechanically depressed, by the activating arm 45, the tip portion 164*a* of the plunger 164 moves toward the drain check valve 158 and knocks a ball 158*a* of the drain check valve 158 off its seat. Knocking the ball 158*a* of the drain check valve 158 off its seat opens the drain check valve allowing fluid in the ram drive fluid conduit 144 to drain back to the reservoir 120 via a drain line 172. It is noted that the hydraulic fluid in the ram drive fluid conduit 144 and thus on the drain check valve 158 may be under high pressure, e.g., as much as 10,000 psi. Such high pressure may be acting on the ball 158*a* of the drain check valve 158. In order for the spool plunger assembly 156 to knock the ball 158*a* of the drain check valve 158 off its seat, a force as high as, for example, 200 lbs may be needed. This force is a force the release member 162 would have to apply to the plunger 164 in order to open the drain check valve 158. With a mechanical release member 162, the force is manually applied by an operator. Forces as high as 200 lbs. require a fairly large lever so that the operator can activate the spool plunger assembly 156 using a finger. To lower the force that may be needed to open the drain check valve 158 to a reasonable value of for example 15 lbs., a pressure balance system 160 may be used with the spool plunger assembly 156. In the embodiment shown, the pressure balance system 160 includes a pilot conduit 166, a sealing member 168 and a biasing member 170. The pilot conduit 166 is connected between the plunger 164 and the ram drive fluid conduit 144. As a result, the pilot conduit 166 would be under the same pressure, e.g., 10,000 psi, as the ram drive fluid conduit 144. The sealing member 168 is positioned around the end portion 164*b* of the plunger 164, as shown in FIG. 35, and seals the end portion 164*b* of the plunger within a housing of the plunger 164 so that hydraulic fluid in the pilot conduit 166 does not pass the end portion 164*b* of the plunger 164. In the embodiment shown, the sealing member 168 is an O-ring. Hydraulic fluid in the pilot conduit 166 acts on the end portion 164*b* of the plunger 164 applying a force on the end portion 164*b* of the plunger 164 in the direction of the drain check valve 158 sufficient to overcome the biasing force of the biasing member 170 so that the tip portion 164*a* of the plunger 164 applies a force against the ball 158*a* of the drain check valve 158. The biasing member 170, e.g., a compression spring, is positioned between the drain check valve 158 and the plunger 164 and normally biases the plunger in a direction away from the drain check valve 158. In this configuration, the pressure balance system 160 reduces the high pressure, e.g., the 10,000 psi, applied to drain check valve 158 so that a lower force is needed to activate the spool plunger assembly 156. It is also noted that the biasing member 170 also biases the plunger 164 to its home position between cycles of the tool 10 permitting the ball 158*a* of the drain check valve 158 to reseat and thus close the drain check valve 158.

Referring again to FIG. 9, an exemplary configuration for coupling the motor 70 to the transmission assembly 80 is shown. In this exemplary embodiment, a collar 73 is attached to the motor 70 using fasteners 74. A collar 81 of the housing 82 of the transmission assembly 80 is then positioned within the collar 73, and pins 75 are inserted into openings 76 in a side wall of the collar 73 through an open area of the collar 73 and through a second opening 76 in the side wall of the collar. When the pins 75 pass through collar 73, the pins 75 pass within grooves 83 in the collar 81 of the transmission assembly housing 82. The portion of the pins 75 resting in the grooves 83 in the collar 81 lock the motor 70 in position relative to the housing 82 in the transmission assembly 80. Continuing to refer to FIG. 9, an exemplary configuration for coupling the motor 70 and the transmission assembly 80 to the pump assembly 140 is shown. In this exemplary embodiment, the housing 143 of the pump assembly 140 has a collar 145 with pin openings 147 in a side wall of the collar 145. Pins 149 are inserted into the openings 147 in the collar 145 into an open area of the collar 145 and through a second opening 147 in the side wall of the collar. When pins 149 pass through the collar 145, the pins 149 pass within grooves 85 in the transmission assembly housing 82. The portion of the pins 149 resting in the grooves 85 in the transmission assembly housing 82 lock the pump assembly housing 143 in position relative to the transmission assembly housing 82.

Referring to FIG. 37-40, another exemplary embodiment for coupling the motor 70 and the transmission assembly 80 to the pump assembly 140 is shown. In this exemplary embodiment, the pump assembly housing 143 has a threaded end 151, e.g., a male threaded end, and the transmission assembly housing 82 has a collar 87 with a threaded interior wall, e.g., a female threaded end. However, it is contemplated that the pump assembly housing 143 may have a female threaded end, and the collar 87 may have a male threaded end. In this embodiment, to couple the motor 70 and the transmission assembly 80 to the pump assembly 140, the end 82*a* of the transmission assembly housing 82 is positioned into the threaded end 151 of the pump assembly housing 143 so that the coupler 87 of the transmission assembly housing 82 can be threaded onto the threaded end 151 of the pump assembly housing 143, as shown. It is noted that the collar 87 of the transmission assembly housing 82 may be fixed to the transmission assembly housing 82 or may be rotatable relative to the transmission assembly housing 82. If the collar 87 of the transmission assembly housing 82 is fixed to the transmission assembly housing 82, the transmission assembly housing 82 or the pump assembly housing 143 may be rotated to thread the collar 87 onto the threaded end 151. If the collar 87 is rotatable relative to the transmission assembly housing 82, the collar 87 may be rotated to thread the collar 87 onto the threaded end 151.

Working Head

Referring now to FIGS. 37-45, an exemplary embodiment of a working head 20 of the tool 10 is shown. As noted above, the working head may be any working head that has an operating cycle driven by hydraulic pressure. Non-limiting examples of working heads 20 that have an operating cycle driven by hydraulic pressure include working heads 20 having a crimp operating cycle and working heads having a cutting operating cycle. In the embodiment shown in FIGS. 37-45, the working head 20 is configured for a crimp operating cycle where a movable die in a die set is moved toward a fixed die in the die set.

In this exemplary embodiment, the working head 20 includes a head frame 200 and a piston assembly 230. The head frame 200 has a substantially C-shaped body 202 forming a working area 204. A proximal end of the body 202 has a flange or neck 206 that is used to couple the piston assembly 230 to the head frame 200. A distal end of the body 202 includes a die seat 208 configured to receive and hold a die of a die set used when performing a crimping operation of the tool 10. Within the working area 204 of the head frame 200 is an interior T-shaped track 210 formed into the body 202. The T-shaped track 210 is configured and dimensioned to interact with a T-shaped guide 256 on a ram 246 of a ram assembly 234, described below.

The piston assembly 230 includes a cylindrical body 232 and a ram assembly 234. The cylindrical body 232 has a face end 236 and an open end providing access to a hollow central portion 238 of the cylindrical body 232. The face end 236 of the cylindrical body 232 includes a stem 240 extending away from the face end 236 such that the stem 240 is substantially perpendicular to the face end 236. The stem 240 is preferably integral to the cylindrical body 232 and serves as a connection point to mate with the ram drive fluid conduit 144 of the pump assembly 140. The cylindrical body 232 has a bore 244 extending through the stem 240 into the hollow central portion 238. Hydraulic fluid from the pump assembly 140 is pumped through the fluid bore 244 to move a ram 246 of the ram assembly 234 from its initial home position (or at rest position), seen in FIG. 41, to a full operating position, which in this embodiment is a crimping position. The cylindrical body 232 is adapted to fit at least partially within the flange or neck 206 of the body 202 of the head frame 200 and to be releasably secured to the flange 206. The face end 236 of the cylindrical body 232 has a rotation groove 264 that mates with an opposing groove in the housing of the pump assembly 140. Pins 266 are passed through openings in the housing of the pump assembly 140 to mate the piston assembly 230 to the pump assembly 140. Once the cylindrical body 232 is mated to the pump assembly housing, the working head assembly 20 can rotate about the stem 240. This configuration permits an operator to rotate the working head assembly 20 relative to the handle assembly 30. In addition, the face end 236 of the cylindrical body 232 may include a dust seal 268 provided to limit and possibly prevent contaminants from entering the rotation groove 264 and stem 240. Adjacent to the dust seal 268 is a guide surface 232*a* of the cylindrical body 232 that provides stability for the working head assembly 20 relative to a face of the pump assembly 140.

The ram assembly 234 is positioned at least partially within the hollow central portion 238 of the cylindrical body 232 and is sealed within the hollow central portion 238 of the cylindrical body 232 using a wiper ring 233 and a "T" seal 235. The wiper ring 233 is sealed between the flange 206 of the body 202 and the cylindrical body 232, as shown in FIGS. 38, 40, 42 and 43. The ram assembly 234 includes a ram 246, a spring holder 248 and two or more nested springs 250. The nested springs 250 are preferably compression type springs. The nested springs 250 provide sufficient force to ensure the ram 246 quickly retracts from the crimping position to the home position so as to reduce the crimp cycle time.

Figure 40:
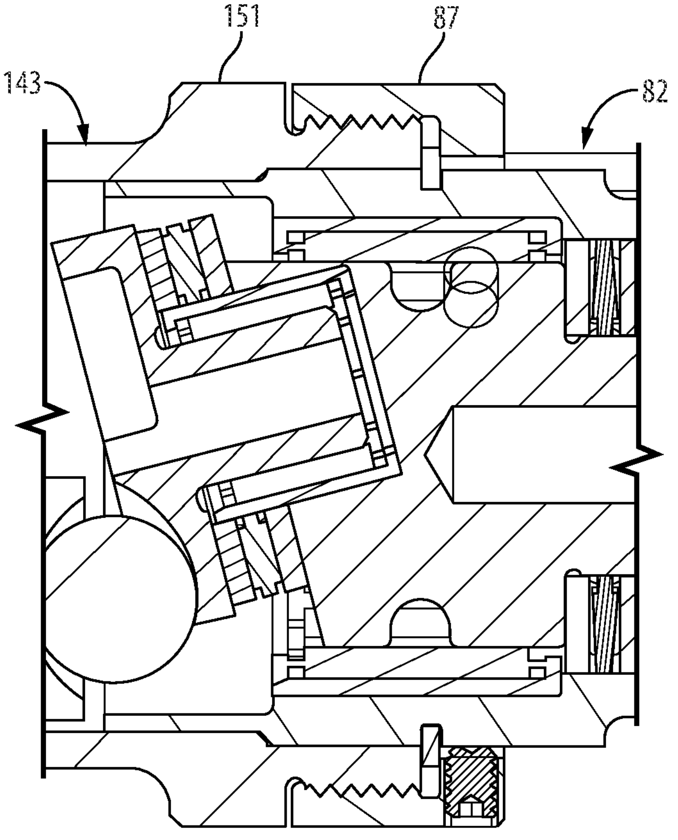
FIG. 40 is a cross-sectional view of the modular power unit of FIG. 39 taken from line 40-40, illustrating the male threaded end of the pump assembly connected to the female threaded collar of the transmission assembly.
Figure 42:
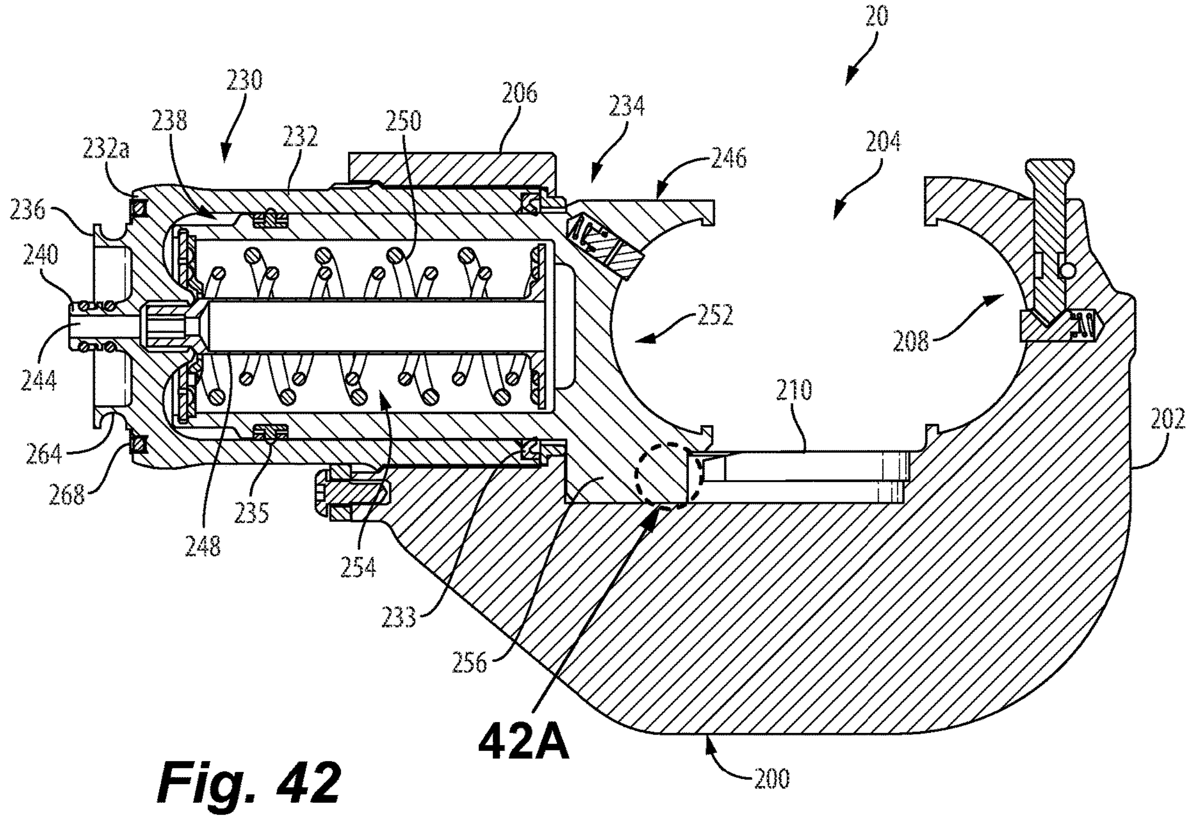
FIG. 42 is a cross-sectional view of the modular working head assembly of FIG. 41 taken from line 42-42 and illustrating a piston assembly of the modular working head assembly.
Figure 42A:
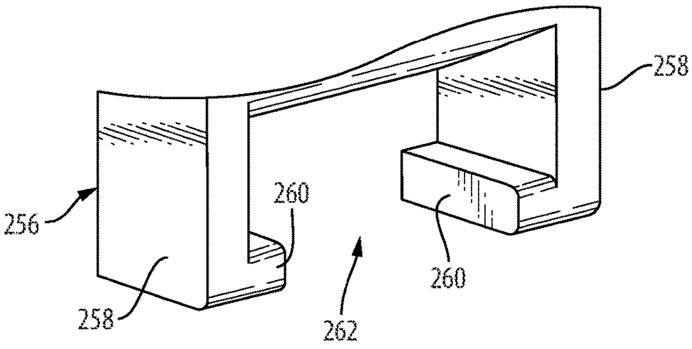
FIG. 42A is an enlarged view of a portion of a T-shaped guide of the piston assembly of FIG. 42 taken from detail 42A.
Figure 43:
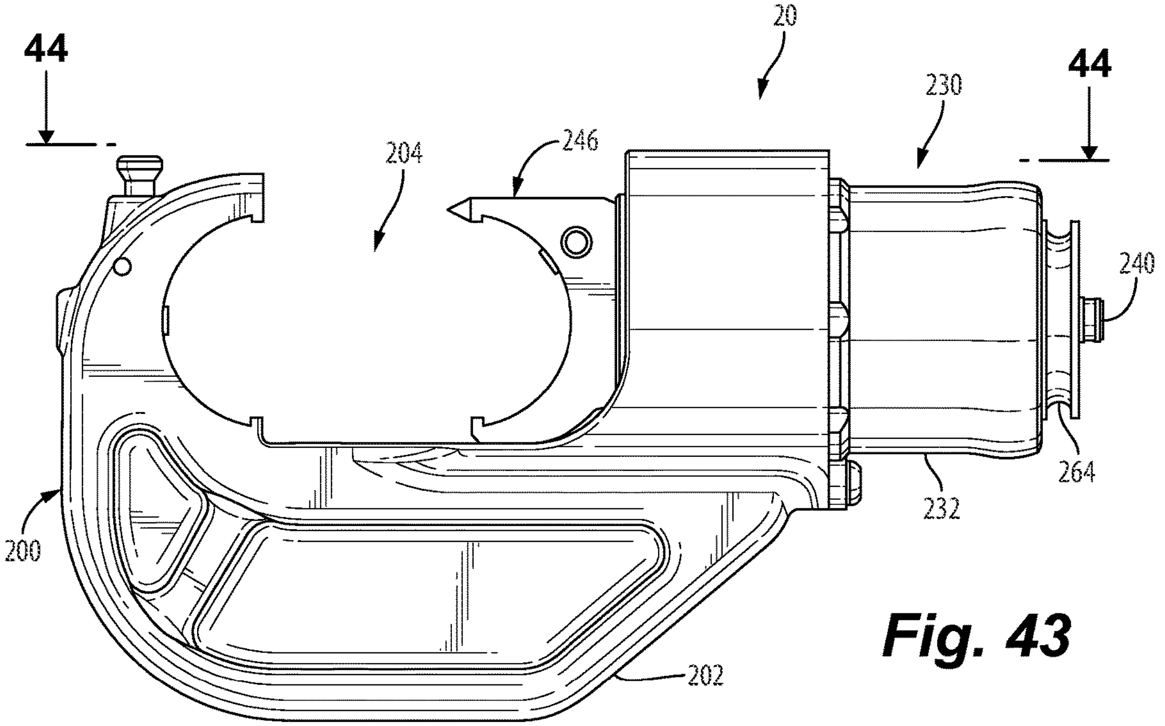
FIG. 43 is a second side elevation view of the modular working head assembly of the portable, hand-held hydraulic tool of FIGS. 1 and 6.
Figure 44:
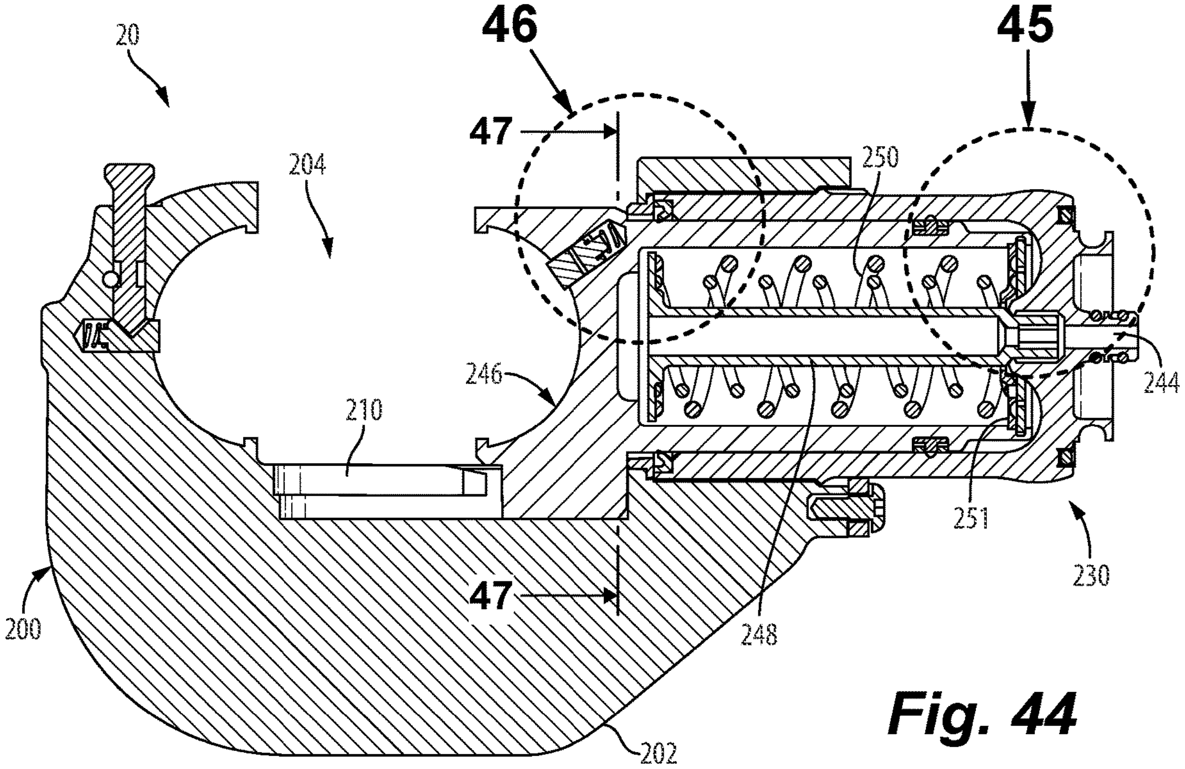
FIG. 44 is a cross-sectional view of the modular working head assembly of FIG. 43 taken from line 44-44 and illustrating a piston assembly of the modular working head assembly.
Figure 45:
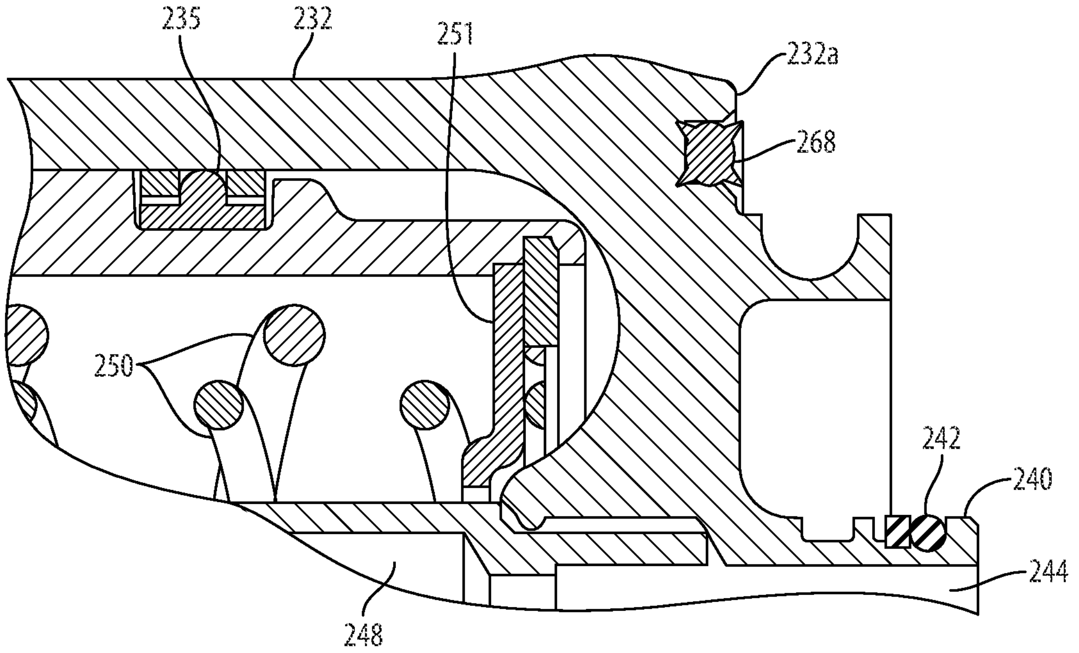
FIG. 45 is an enlarged view of a portion of the piston assembly of FIG. 44 taken from detail 45.
Figure 46:
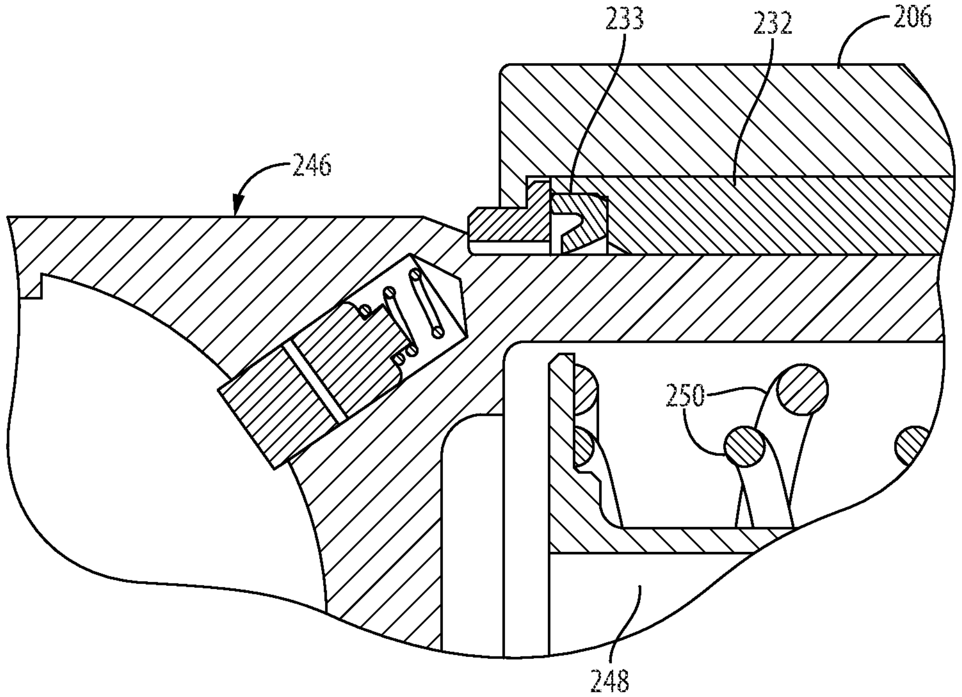
FIG. 46 is an enlarged view of a portion of the piston assembly of FIG. 44 taken from detail 46.
Figure 47:
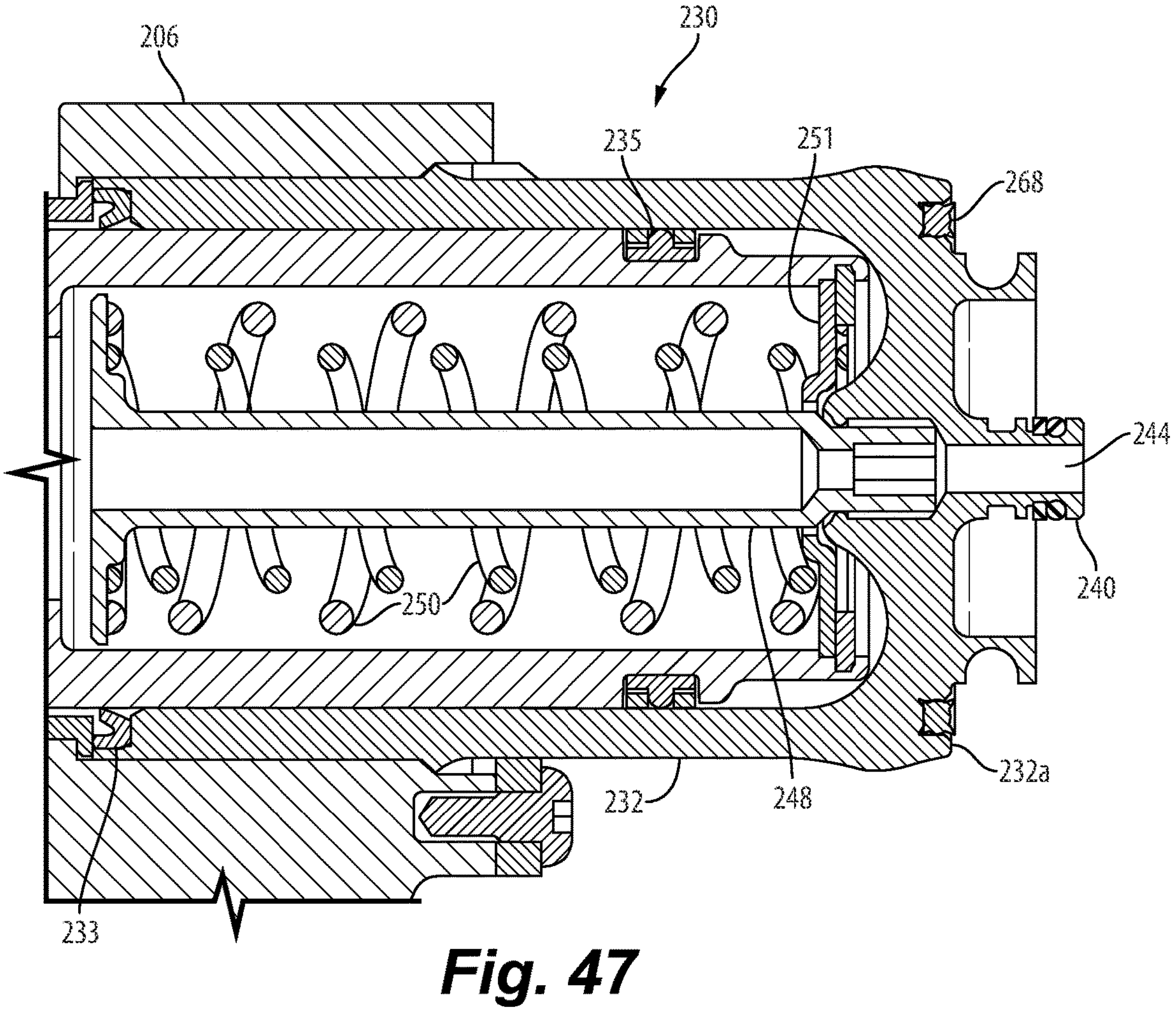
FIG. 47 is an is an enlarged view of a portion of the piston assembly of FIG. 44 taken from line 44-44.
Figure 48:
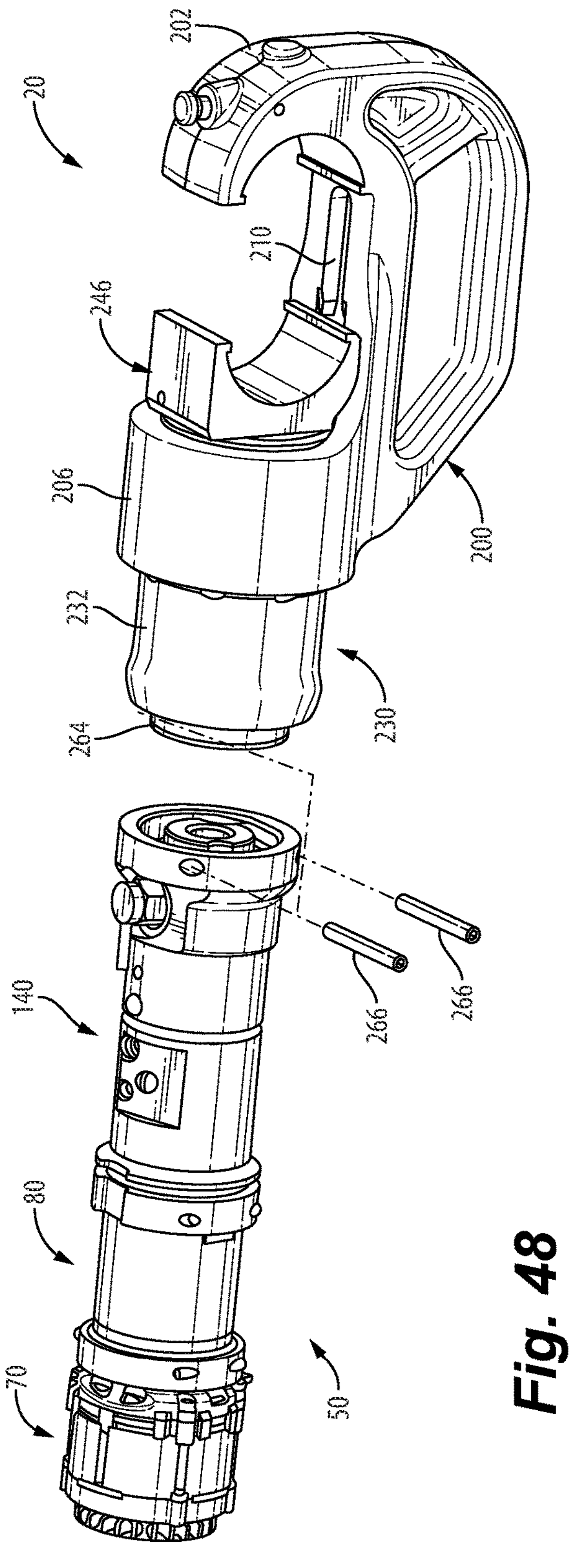
FIG. 48 is a perspective view of the modular power unit of FIG. 8 positioned for coupling to the modular working head assembly of FIG. 41.
Figure 49:
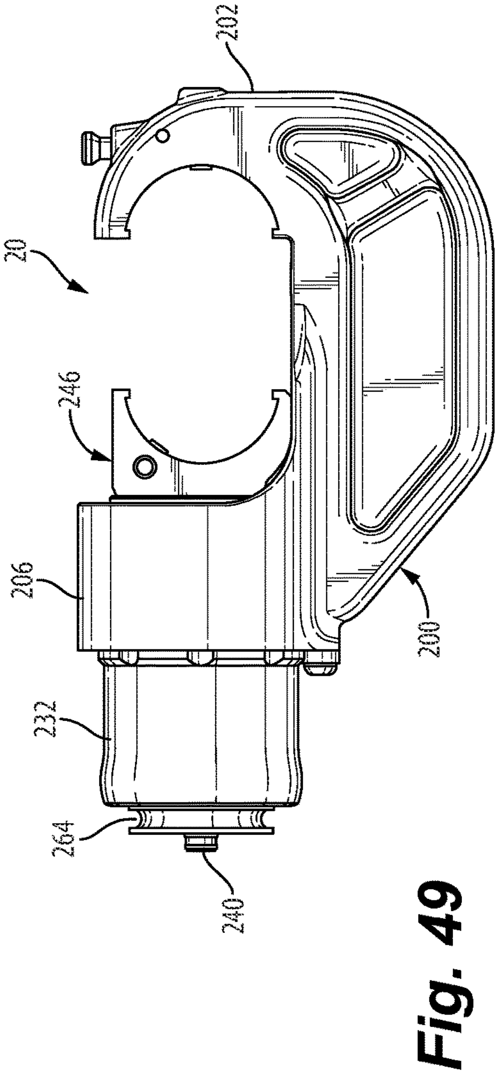
FIG. 49 is a side elevation view of the working head of FIG. 48, illustrating a rotational groove of the piston assembly of the modular working head assembly configured to mate with a corresponding rotational groove in a collar of the pump assembly.

The ram 246 has a die seat 252 at one end and a hollow piston 254 adjacent the die seat, as shown in FIG. 42. The die seat 252 includes a T-shaped guide 256 that is configured and dimensioned to operatively interact with the T-shaped track 210 in the working area 204 of the head frame 200. More specifically, the T-shaped guide 256 has two legs 258, seen in FIG. 42A. Each leg 258 has a track guide arm 260 that extends toward the opposite leg such that the legs 258 and track guide arms 260 form a T-shaped channel 262 for receiving the T-shaped track 210. The spring holder 248 and the two or more nested springs 250 are positioned with in the hollow piston 254 of the ram 246 with spring holder 248 positioned in the center of the two or more nested springs 250 and a retainer 251 supporting the two or more nested springs 250, as seen in FIGS. 40 and 41. A non-limiting example of a retainer 251 is a clip and washer assembly. It is noted that in this configuration, with the spring holder 248 and the retainer 251, the overall length of the assembly is greatly reduced, thus reducing the overall weight of the tool 10. One end of the spring holder 248 is positioned within the opening 244 in the cylindrical body 232 such that when hydraulic fluid is pumped into the opening 244 in the stem 240, the ram 246 moves along the T-shaped track 210 from the at home (or rest) position to the crimping position.

Figure 50:
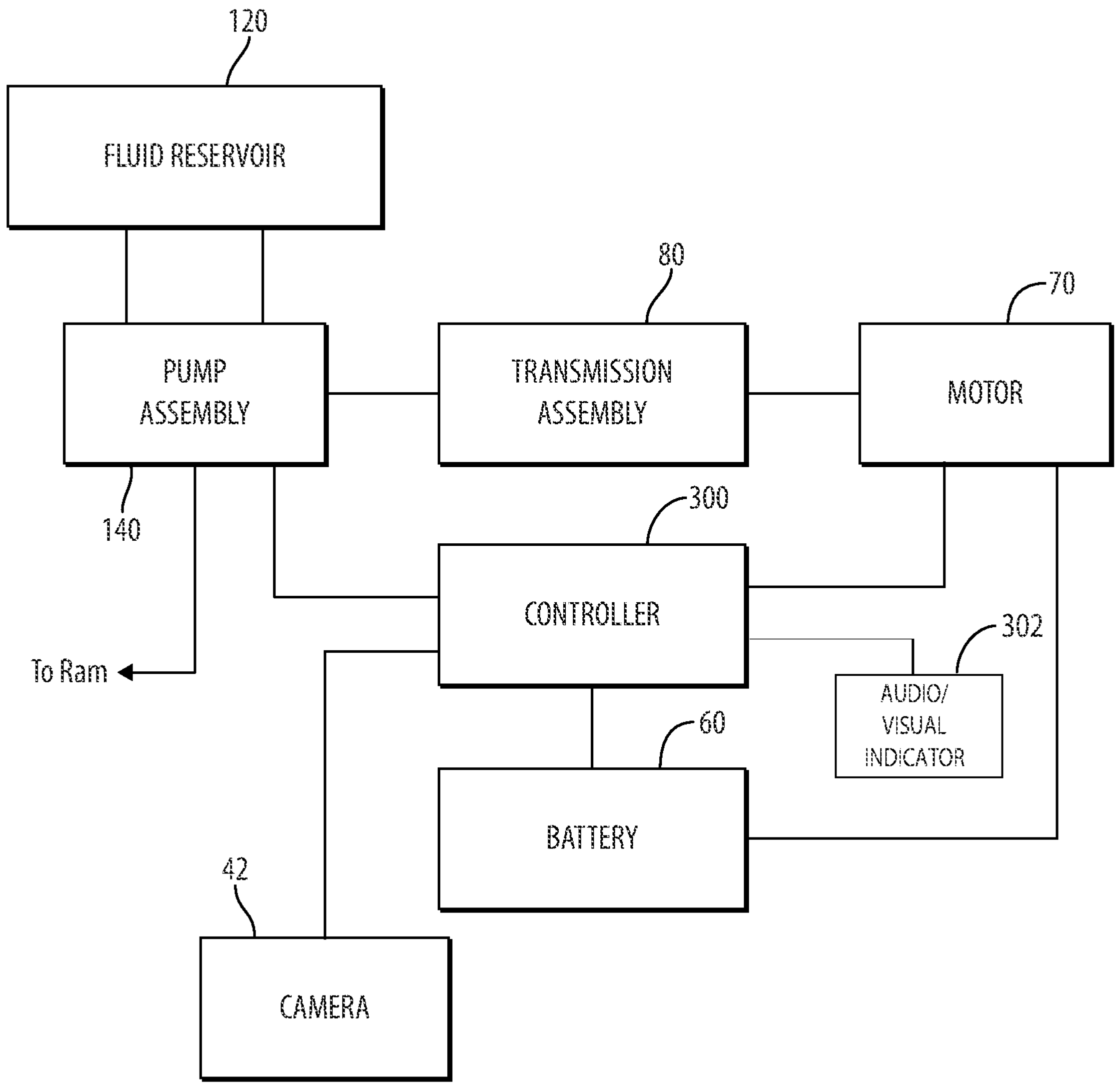
FIG. 50 is an exemplary block diagram for describing various parts of the tool shown in FIGS. 1 and 6.

Referring now to FIG. 50, the motor 70, the transmission assembly 80, the fluid reservoir 120, the pump assembly 140, a controller 300 are shown in block form and as described above are located within the tool frame 32 of the handle assembly 30. It is noted that the tool 10 may also include a camera 42, seen in block form in FIG. 50, mounted to the exterior of the tool frame 32 and oriented to provide a video of a working area of the working head assembly 20. The battery 60 is removably connected to one end of the hand grip portion 38 of the tool frame 32. In another embodiment, the battery 60 could be removably mounted or connected to any suitable position on the tool frame 32. In another embodiment, the battery 60 may be affixed to the tool 10 so that it is not removable. The battery 60 is preferably a rechargeable battery, such as a lithium ion battery, that can output a voltage of at least 12 VDC, and preferably in the range of between about 12 VDC and about 56 VDC.

Continuing to refer to FIG. 50, the motor 70 is coupled to the battery 60 and the controller 300, and its operation is controlled by the controller 300. Generally, the motor 70 is adapted to operate at a nominal voltage corresponding to the voltage of the battery 60, e.g., between about 12 VDC and about 24 VDC. Under a no-load condition, such a motor 70 can operate at about 21,000 rpm with a current of about 2.7 amps. At maximum efficiency, the motor 70 can operate at about 15,000 rpm with a current of about 12 amps, a torque of about 75 mN-m, and an output of about 165 W. An example of such an 18 VDC motor 70 is the RS-550VC-7030 motor, manufactured by Mabuchi Motor Co., Ltd. of Chiba-ken, Japan. However, as noted above, any suitable type of motor adapted to operate at or above a 12 VDC nominal voltage could be used. As another example, the motor may be a motor adapted to operate at a 24 VDC nominal voltage. The output shaft of the motor 60 is connected to the transmission assembly 80 which is connected to the pump assembly 140 as described above. While the transmission assembly 80 is described using a multi-stage planetary gear assembly, any suitable type of gear reduction assembly could be used with the transmission assembly 80.

In another exemplary embodiment, the controller 300 may be adapted to sense a current drop of electricity to the motor 70. When the pressure relief valve 56 opens, resistance to rotation of the motor 30 is reduced such that the motor draws less current. The controller 36 senses this current drop via a current sensor (not shown), and automatically deactivates the motor 30 for a predetermined period of time. In one embodiment, the predetermined period of time is between about 2 seconds and about 3 seconds. However, any suitable predetermined period of time could be set. In another embodiment, the controller 34 could be adapted to deactivate the motor 30 until a reset button or reset like procedure is performed by the operator. With this type of system, an operator can sense via tactile feedback that the motor 30 and pump 28 have stopped and would not need to rely on an audible signal being heard or a visual signal from the indicator 54 positioned on the tool 10.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art and are intended to fall within the scope of the invention.

What is claimed is:

1. A hydraulic power tool comprising:

a handle assembly housing a power unit that includes:

a motor having a collar that includes a sidewall with at least one opening;

a transmission assembly having a housing, the transmission assembly housing having a collar at a first end and a second end, the collar at the first end of the transmission assembly housing being configured to be inserted at least partially into the motor collar such that a locking member may be inserted into the at least one opening to operatively couple the transmission assembly to the motor; and a pump assembly having a housing, the pump assembly housing having a collar at a first end and a second end, the collar at the first end of the pump assembly housing being configured to mate with the second end of the transmission assembly housing to operatively couple the pump assembly to the transmission assembly; and a working head assembly operatively coupled to the handle assembly, the working head assembly having a head frame and a piston assembly coupled to the head frame, the piston assembly being rotatably coupled to the second end of the pump assembly housing such that the piston assembly is in fluid communication with an output conduit of the pump assembly.

2. The hydraulic power tool according to claim 1, further comprising a fluid reservoir in fluid communication with a pump of the pump assembly.

3. The hydraulic power tool according to claim 1, wherein the transmission assembly comprises a gear assembly and a pump drive assembly.

4. The hydraulic power tool according to claim 3, wherein the gear assembly comprises a multi-stage gear system.

5. The hydraulic power tool according to claim 3, wherein the pump drive assembly comprises a drive member operatively coupled to a wobble plate such that rotational movement of the drive member is translated to reciprocal linear movement of the wobble plate.

6. The hydraulic power tool according to claim 5, wherein the drive member is associated with a first bearing system, and the wobble plate is associated with a second bearing system.

7. The hydraulic power tool according to claim 1, wherein the pump assembly comprises a unitary pump that includes a low pressure pump and a high pressure pump.

8. The hydraulic power tool according to claim 1, wherein the locking member is a pin.

9. A hydraulic power tool comprising:

a frame housing a modular power unit that includes:

a motor module having a collar that includes a sidewall with at least one opening; and a transmission module having a housing, the transmission module housing having a collar at a first end and a second end, the collar at the first end of the transmission module housing being configured to be inserted at least partially into the motor module collar such that a locking member may be inserted into the at least one opening to operatively couple the transmission module to the motor module such that rotational movement within the transmission module is translated to reciprocal linear movement to drive a pump module, the pump module having a housing, the pump module housing having a collar at a first end and a second end, the collar at the first end of the pump module housing being configured to mate with the second end of the transmission module housing, the pump module having a unitary pump that includes a low pressure pump and a high pressure pump; and a working head assembly operatively coupled to the frame, the working head assembly having a head frame and a piston assembly coupled to the head frame, the piston assembly being rotatably coupled to the second end of the pump module housing such that the piston assembly is in fluid communication with an output conduit of the unitary pump.

10. The hydraulic power tool according to claim 9, further comprising a fluid reservoir in fluid communication with the unitary pump of the pump module.

11. The hydraulic power tool according to claim 9, wherein the transmission module comprises a gear assembly and a pump drive assembly.

12. The hydraulic power tool according to claim 11, wherein the gear assembly comprises a multi-stage gear system.

13. The hydraulic power tool according to claim 11, wherein the pump drive assembly comprises a drive member operatively coupled to a wobble plate, and wherein the rotational movement within the transmission module is rotational movement of the drive member and the rotational movement of the drive member is translated to reciprocal linear movement of the wobble plate.

14. The hydraulic power tool according to claim 13, wherein the drive member is associated with a first bearing system, and the wobble plate is associated with a second bearing system.

15. The hydraulic power tool according to claim 9, wherein the locking member is a pin.

16. A hydraulic power tool comprising:

a frame housing a power unit that includes:

a motor having a motor housing and a motor drive shaft, the motor housing having a collar including a sidewall with at least one opening;

a transmission assembly enclosed within a housing having a collar at a first end and a second end, the transmission assembly housing collar being configured to at least partially be inserted into the motor housing collar such that a locking member may be inserted into the at least one opening to operatively couple the motor to the transmission assembly, the transmission assembly being operatively coupled to the motor drive shaft; and a pump assembly enclosed within a housing having a collar at a first end and a second end, the pump assembly housing collar being coupled to the second end of the transmission assembly housing, such that the pump assembly being operatively coupled to the transmission assembly; and a working head assembly operatively coupled to the frame, the working head assembly having a head frame and a piston assembly coupled to the head frame, the piston assembly being rotatably coupled to the second end of the pump assembly housing such that the piston assembly is in fluid communication with an output conduit of the pump assembly.

17. The hydraulic power tool according to claim 16, further comprising a fluid reservoir in fluid communication with a pump of the pump assembly.

18. The hydraulic power tool according to claim 16, wherein the transmission assembly comprises a gear assembly and a pump drive assembly.

19. The hydraulic power tool according to claim 18, wherein the gear assembly comprises a multi-stage gear system.

20. The hydraulic power tool according to claim 18, wherein the pump drive assembly comprises a drive member operatively coupled to a wobble plate such that when the motor drive shaft rotates the rotational movement of the motor drive shaft is translated to rotational movement of the drive member, and rotational movement of the drive member is translated to reciprocal linear movement of the wobble plate.

21. The hydraulic power tool according to claim 20, wherein the drive member is associated with a first bearing system, and the wobble plate is associated with a second bearing system.

22. The hydraulic power tool according to claim 16, wherein the pump assembly comprises a unitary pump that includes a low pressure pump and a high pressure pump.

23. The hydraulic power tool according to claim 16, wherein the locking member is a pin.

* * * * *